US011221630B2

(12) United States Patent
Nishi et al.

(10) Patent No.: US 11,221,630 B2
(45) Date of Patent: Jan. 11, 2022

(54) WORK VEHICLE

(71) Applicant: KUBOTA CORPORATION, Osaka (JP)

(72) Inventors: Keishiro Nishi, Sakai (JP); Atsushi Shinkai, Sakai (JP); Tomofumi Fukunaga, Sakai (JP); Takahiro Nakatsuka, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 259 days.

(21) Appl. No.: 16/469,648

(22) PCT Filed: Dec. 15, 2017

(86) PCT No.: PCT/JP2017/045109
§ 371 (c)(1),
(2) Date: Jun. 14, 2019

(87) PCT Pub. No.: WO2018/135201
PCT Pub. Date: Jul. 26, 2018

(65) Prior Publication Data
US 2019/0317521 A1 Oct. 17, 2019

(30) Foreign Application Priority Data

Jan. 20, 2017 (JP) .............................. JP2017-008349
Jan. 20, 2017 (JP) .............................. JP2017-008350

(51) Int. Cl.
G05D 1/02 (2020.01)
B62D 25/06 (2006.01)
B62D 49/06 (2006.01)

(52) U.S. Cl.
CPC ......... G05D 1/0276 (2013.01); G05D 1/0231 (2013.01); G05D 1/0287 (2013.01);
(Continued)

(58) Field of Classification Search
CPC .. G05D 1/0276; G05D 1/0231; G05D 1/0287; G05D 2201/0201; B62D 25/06;
(Continued)

(56) References Cited

U.S. PATENT DOCUMENTS 9,707,900 B1\* 7/2017 Townsend ............... B60R 9/048
2004/0233284 A1\* 11/2004 Lesesky ........... G08B 13/19619
348/148
(Continued)

FOREIGN PATENT DOCUMENTS

JP 06-270747 9/1994
JP 2003-112579 4/2003
(Continued)

OTHER PUBLICATIONS

Extended European Search Report for corresponding EP Application No. 17893228.1-1004, dated Aug. 13, 2020.
(Continued)

Primary Examiner — James J Lee
Assistant Examiner — Shon G Foley
(74) Attorney, Agent, or Firm — Mori & Ward, LLP

(57) ABSTRACT

An objective is to appropriately position a communication module that carries out wireless communication to exchange information regarding cooperative travel with another vehicle, in order to simplify the measures that are to be taken to avoid thermal damage, and prevent antenna cables from being damaged, for example. A work vehicle includes: a cabin 4 in which a boarding space is formed; and an electronic control system for automatic driving through which a vehicle body is automatically driven. The electronic control system includes a positioning unit that measures the position and orientation of the vehicle body, and a cooperation control unit that causes the vehicle body to automatically travel in cooperation with another vehicle. The cabin 4
(Continued)

is provided with a roof 62 that provides a storage space 62A that is surrounded by an inner roof 101 and an outer roof 102. The cooperation control unit includes a communication module 71 that wirelessly communicates with another vehicle to exchange information regarding cooperative travel with the other vehicle, including vehicle body position information. Antennas of the communication module 71 are provided on an upper end portion of the cabin 4, and a communication information processing apparatus 122 of the communication module 71 is provided in the storage space 62A.

12 Claims, 18 Drawing Sheets

(52) U.S. Cl.
 CPC .............. *B62D 25/06* (2013.01); *B62D 49/06* (2013.01); *G05D 2201/0201* (2013.01)

(58) Field of Classification Search
 CPC .... B62D 49/06; B62D 33/0617; B62D 49/00; A01B 69/001; H04N 7/18; B60R 11/02; G08G 1/00; G08G 1/09; G08G 1/16
 See application file for complete search history.

(56) References Cited

U.S. PATENT DOCUMENTS

| | | | |
|---|---|---|---|
| 2005/0055132 A1* | 3/2005 | Matsumoto | ............ B25J 9/1682 700/245 |
| 2007/0187969 A1* | 8/2007 | Dowd | ....................... B60R 7/02 296/37.1 |
| 2016/0159282 A1* | 6/2016 | Kurihara | ........... B32B 17/10541 348/148 |
| 2016/0174453 A1 | 6/2016 | Matsuzaki et al. | |
| 2016/0202870 A1 | 7/2016 | Takahashi et al. | |
| 2017/0129306 A1 | 5/2017 | Komatsu | |
| 2017/0139418 A1* | 5/2017 | Hiramatsu | ................ B60T 7/22 |
| 2017/0177003 A1 | 6/2017 | Yokoyama et al. | |
| 2017/0248946 A1* | 8/2017 | Ogura | .................. G05D 1/0022 |

FOREIGN PATENT DOCUMENTS

| | | |
|---|---|---|
| JP | 2005-59641 | 3/2005 |
| JP | 2005-239133 | 9/2005 |
| JP | 3128621 | 12/2006 |
| JP | 2013-22980 | 2/2013 |
| JP | 2013-196040 | 9/2013 |
| JP | 2015-20674 | 2/2015 |
| JP | 2015-20675 | 2/2015 |
| JP | 2015-201155 | 11/2015 |
| JP | 2016-017881 | 2/2016 |
| JP | 2016-31649 | 3/2016 |
| JP | 2016-68625 | 5/2016 |
| JP | 2016-78610 | 5/2016 |
| JP | 2016-130910 | 7/2016 |
| WO | WO 2016/017367 | 2/2016 |
| WO | WO 2016/017608 | 2/2016 |

OTHER PUBLICATIONS

Japanese Office Action for corresponding JP Application No. 2017-008349, dated Oct. 8, 2019 (w/ English machine translation).
International Search Report for corresponding International Application No. PCT/JP2017/045109, dated Mar. 13, 2018.
Japanese Office Action for corresponding JP Application No. 2020-047927, dated Jun. 15, 2021 (w/ machine translation).

* cited by examiner

WORK VEHICLE

TECHNICAL FIELD

The present invention relates to a work vehicle that includes a cabin in which a boarding space is formed, and an automatic driving electronic control system for automatically driving a vehicle body, and to a work vehicle that includes a driver's seat that is supported by a seat supporting member with seat suspensions being interposed therebetween, and a terminal apparatus for inputting information to, and outputting information from, an on-board electronic control unit.

BACKGROUND ART

In recent years, in order to resolve the issue of a shortage of human resources and improve work efficiency of farm work where a work vehicle such as a tractor or a combine is used, for example, a work vehicle cooperation system or the like that enables an unmanned child work vehicle and a manned parent work vehicle to travel and carry out a task in cooperation with each other has been developed, for example. A work vehicle used in a work vehicle cooperation system or the like includes, for example, a communication module that wirelessly communicates with another vehicle to exchange information regarding cooperative travel with the other vehicle, including vehicle body position information (for example, see Patent Document 1).

Although Patent Document 1 does not describe the position or the like of the communication module, some automatic driving work vehicles include a network communication module and a network communication antenna for transmitting work vehicle information via a wireless communication network, and in which the network communication module is stored in an electric control box located in a lower part of a cabin, the network communication antenna is located in the upper end region of the cabin, and the network communication module and the network communication antenna are connected to each other using an antenna cable that is laid on the outer surface of a rear wall of the cabin (for example, see Patent Document 2).

Also, in some work vehicles, a remote operation apparatus, which is an example of a terminal apparatus, is attached to a dashboard, for example (for example, see Patent Document 3).

PRIOR ART DOCUMENTS

Patent Documents

Patent Document 1: JP 2016-31649A
Patent Document 2: JP 2015-20674A
Patent Document 3: JP 2015-201155A (Paragraphs 0032 to 0034)

SUMMARY OF THE INVENTION

Problem to be Solved by the Invention

With the configuration disclosed in Patent Document 2, a lower part of the cabin is located near an engine, of which the temperature significantly increases, for example, and in order to install a communication module therein, it is necessary to take measures to avoid thermal damage, such as by applying a heat shield. Also, it is troublesome to lay the antenna cable so as to span between the network communication module in the lower part of the cabin and the network communication antenna in the upper end region of the cabin. In addition, such an elongated antenna cable which spans from the lower part to the upper end region of the cabin, is exposed to the outside, and therefore there is the risk of the antenna cable being damaged by another object coming into contact with the antenna cable during work.

That is to say, there is a demand to appropriately position the communication module that carries out wireless communication to exchange information regarding cooperative travel with another vehicle, in order to simplify the measures that are to be taken to avoid thermal damage, and prevent the antenna cables from being damaged, for example.

In the configuration in Patent Document 3 or the like, when vibrations from the road surface are absorbed by the seat suspensions, the terminal apparatus attached to the dashboard shakes relative to the driver sitting on the driver's seat. As a result, it is difficult for the driver to operate the terminal apparatus or visually check content displayed on the terminal apparatus.

That is to say, there is a demand to improve the operability of the terminal apparatus in the work vehicle and improve the visibility of content displayed on the terminal apparatus.

Means for Solving Problems

As means for solving the above-described problems,
a work vehicle according to the present invention includes: a cabin in which a boarding space is formed; and an electronic control system for automatic driving through which a vehicle body is automatically driven,
wherein the electronic control system includes a positioning unit that measures the position and orientation of the vehicle body, and a cooperation control unit that causes the vehicle body to automatically travel in cooperation with another vehicle,
the cabin is provided with a roof that provides a storage space that is surrounded by an inner roof and an outer roof,
the cooperation control unit includes a communication module that wirelessly communicates with another vehicle to exchange information regarding cooperative travel with the other vehicle, including vehicle body position information, and
antennas of the communication module are provided on an upper end portion of the cabin, and a communication information processing apparatus of the communication module is provided in the storage space.

With this means, the upper portion of the cabin on which the antennas are provided is the upper end portion of the vehicle body, which leads to desirable sensitivity of the antennas. Also, the roof of the cabin in which the communication information processing apparatus is provided is located at the upper most portion of the vehicle body, which is far away from the engine, which exhibits a significant rise in temperature, and the roof allows external air to flow into or around the cabin. Therefore, it is possible to simplify the measures that are to be taken to avoid thermal damage to the communication information processing apparatus. The communication information processing apparatus is located in the storage space of the roof. Therefore, it is possible to protect the communication information processing apparatus from rainwater, dust, and so on, without the need to provide a special waterproof structure or dustproof structure. In addition, the antennas and the communication information processing apparatus are located close to each other, and therefore, the antenna cables between them are short and can be easily installed. Also, it is easy to avoid the risk of the antenna cables being damaged during travel, by coming into contact with another object.

That is to say, the antennas and the communication information processing apparatus of the communication module can be desirably provided together in an upper portion of the cabin. As a result, it is possible to simplify the measures that are to be taken to avoid thermal damage, and prevent the antenna cables from being damaged, for example.

As means for solving the above-described problems, a work vehicle according to the present invention includes: a driver's seat that is supported by a seat supporting member with a seat suspension being interposed therebetween; and a terminal apparatus for inputting information to, and outputting information from, an on-board electronic control unit, wherein the terminal apparatus is supported by a supporting arm that extends from the driver's seat.

With this means, when vibrations from the road surface are absorbed by the seat suspension, vibration of the terminal apparatus is reduced as well as vibration of the driver's seat. Therefore, it is possible to significantly suppress shake of the terminal apparatus relative to the driver sitting on the driver's seat. As a result, it is easier for the driver to operate the terminal apparatus and visually check content displayed on the terminal apparatus.

That is to say, it is possible to improve the operability of the terminal apparatus in the work vehicle and the visibility of content displayed on the terminal apparatus. As a result, it is possible to reduce the effort required to operate the work vehicle.

As one means for making the present invention more preferable, the work vehicle further includes:

an in-vehicle information acquisition unit that acquires in-vehicle information including a vehicle speed; and a monitoring unit that monitors the surroundings of the vehicle body, wherein the antennas include an antenna for in-vehicle information communication through which in-vehicle information acquired by the in-vehicle information acquisition unit is communicated as information regarding cooperative travel with another vehicle, and antennas for monitored information communication through which monitored information monitored by the monitoring unit is communicated as information regarding cooperative travel with another vehicle.

With this means, in-vehicle information such as the vehicle speed acquired by the in-vehicle information acquisition unit and monitored information monitored by the monitoring unit can be shared with another vehicle that is carrying out cooperative travel. By effectively using the shared in-vehicle information and monitored information, it is easier to perform vehicle speed adjustment in conjunction with the other vehicle that is carrying out cooperative travel, avoid contact with an obstacle in conjunction with the other vehicle that is carrying out cooperative travel, and so on. As a result, it is possible to more reliably avoid contact with another vehicle that is carrying out cooperative travel, for example.

As one means for making the present invention more preferable, the monitoring unit includes monitoring cameras that capture images of the surroundings of the vehicle body, and an image processing apparatus that processes the images captured by the monitoring cameras, and the image processing apparatus is provided in the storage space.

With this means, images of the surroundings of the vehicle body, which have been captured by the monitoring cameras and have been processed by the image processing apparatus, can be shared with another vehicle that is carrying out cooperative travel. By effectively using the shared images of the surroundings of the vehicle body, it is even easier to perform vehicle speed adjustment in conjunction with the other vehicle that is carrying out cooperative travel, avoid contact with an obstacle in conjunction with the other vehicle that is carrying out cooperative travel, and so on. As a result, it is possible to more reliably avoid contact with another vehicle that is carrying out cooperative travel, for example.

Also, the storage space of the roof is used to provide the image processing apparatus, and therefore there is no need to stress over positioning of the image processing apparatus and taking measures to avoid thermal damage. Also, since the image processing apparatus is provided in the storage space of the roof together with the communication information processing apparatus, it is possible to efficiently perform attachment and maintenance work on the image processing apparatus as well as on the communication information processing apparatus.

As one means for making the present invention more preferable, the monitoring unit includes, as the monitoring cameras, a front monitoring camera that captures an image of objects that are located forward of the vehicle body, a right monitoring camera that captures an image of objects that are located to the right of the vehicle body, a left monitoring camera that captures images of objects that are located to the left of the vehicle body, and a rear monitoring camera that captures an image of objects that are located rearward of the vehicle body, the front monitoring camera is provided at a front end of the upper end portion of the cabin, at a central position in a left-right direction, the right monitoring camera is provided at a right end of the upper end portion of the cabin, the left monitoring camera is provided at a left end of the upper end portion of the cabin, and the rear monitoring camera is provided at a rear end of the upper end portion of the cabin, at a central position in the left-right direction.

With this means, it is possible to capture images of the entire surroundings of the vehicle body, and, by sharing the images of the surroundings with another vehicle that is carrying out cooperative travel and effectively using the images, it is even easier to perform vehicle speed adjustment in conjunction with the other vehicle that is carrying out cooperative travel, avoid contact with an obstacle in conjunction with the other vehicle that is carrying out cooperative travel, and so on. As a result, it is possible to more reliably avoid contact with another vehicle that is carrying out cooperative travel, for example.

As one means for making the present invention more preferable, the monitoring cameras are each provided on the upper end portion of the cabin with an angle adjuster being interposed therebetween, the angle adjuster changing the installation angle of the monitoring camera in a top-bottom direction.

With this means, it is easy to appropriately adjust the installation angles of the monitoring cameras, and it is possible to more desirably capture images of the entire surroundings of the vehicle body.

As one means for making the present invention more preferable, the monitoring unit includes lights that illuminate areas that are to be captured by the monitoring cameras.

With this means, during night work carried out for the purpose of resolving the issue of a shortage of human resources and prevent heatstroke, for example, it is possible to desirably capture images of the surroundings of the vehicle body using the monitoring cameras. By sharing the images of the surroundings with another vehicle that is carrying out cooperative travel and effectively using the images, it is easier to adjust the vehicle speed relative to the vehicle speed of the other vehicle that is carrying out cooperative travel, and avoid contact with an obstacle in conjunction with the other vehicle that is carrying out cooperative travel, even during night work in which visibility is low. As a result, it is possible to more reliably avoid contact with another vehicle that is carrying out cooperative travel, for example, even during night work in which visibility is low.

As one means for making the present invention more preferable, the monitoring unit includes an obstacle searcher that searches for an obstacle and a search information processing apparatus that performs determination processing to determine whether or not an obstacle has approached based on search information from the obstacle searcher, and the search information processing apparatus is provided in the storage space.

With this means, determination information of the search information processing apparatus, which is based on search information of the obstacle searcher, can be shared with another vehicle that is carrying out cooperative travel. By effectively using the shared determination information, it is even easier to avoid contact with an obstacle in conjunction with the other vehicle that is carrying out cooperative travel.

Also, the storage space of the roof is used to provide the search information processing apparatus, and therefore there is no need to stress over arranging of the image processing apparatus and taking measures to avoid thermal damage. Also, since the search information processing apparatus is provided in the storage space of the roof together with the communication information processing apparatus and the image processing apparatus, it is possible to efficiently perform attachment and maintenance work on the search information processing apparatus as well as on the image processing apparatus and the communication information processing apparatus.

As one means for making the present invention more preferable, the cabin includes a roof frame that has a substantially rectangular shape in plan view and detachably supports the outer roof, and a cross member that is detachably installed so as to span between left and right end portions of the roof frame, and the cross member includes a supporting member that supports the communication information processing apparatus, the image processing apparatus, and the search information processing apparatus in the storage space.

With this means, the communication information processing apparatus, the image processing apparatus, and the search information processing apparatus are attached to the cross member such that they are supported by the supporting portion of the cross member, and thus these apparatuses can be integrated into a processing unit. After the cross member of the processing unit has been installed so as to span left and right side portions of the roof frame, an outer roof is attached to the roof frame, and thus the communication information processing apparatus, the image processing apparatus, and the search information processing apparatus can be stored in the storage space of the roof. Also, in this stored state, by detaching the outer roof from the roof frame, the processing unit can be exposed to the outside, and the processing unit can be detached from the roof frame.

That is to say, it is possible to improve ease of attaching the communication information processing apparatus, the image processing apparatus, and the search information processing apparatuses to the storage space of the roof, and ease of performing maintenance work on these apparatuses.

As one means for making the present invention more preferable, the antennas for monitored information communication include an antenna for image information communication through which information from the image processing apparatus is communicated, and an antenna for search information communication through which information from the search information processing apparatus is communicated.

With this means, information from the image processing apparatus and information from the search information processing apparatus can be desirably communicated via the respective dedicated antennas respectively.

As one means for making the present invention more preferable, the work vehicle further includes:

a contact avoidance control unit that outputs an emergency stop instruction to the cooperation control unit upon detecting that an obstacle has approached based on the result of determination performed by the search information processing apparatus, wherein the cooperation control unit communicates with another vehicle to exchange the emergency stop instruction via the communication module as information regarding cooperative travel with the other vehicle, and performs emergency stop control to cause the vehicle body to make an emergency stop based on the emergency stop instruction.

With this means, if the contact avoidance control unit of one of a plurality of work vehicles that are carrying out cooperative travel outputs an emergency stop instruction, this emergency stop instruction is shared with another vehicle that is carrying out cooperative travel, and the cooperative control units of the work vehicles perform emergency stop control based on the shared emergency stop instruction. As a result, it is possible to prevent one work vehicle from colliding with an obstacle, and avoid the risk of work vehicles colliding with each other due to a work vehicle making an emergency stop.

As one means for making the present invention more preferable, the work vehicle further includes:

a display apparatus in the boarding space, the display apparatus displaying information regarding another vehicle received by the communication module.

With this means, for example, if an administrator who manages the operations of work vehicles that are travelling in cooperation with each other is on board and drives one work vehicle, the administrator can easily monitor and grasp the state of operation of other vehicles that are carrying out cooperative travel and the state of the surroundings of the other vehicles while staying in the boarding space.

Also, a work vehicle that is provided with monitoring cameras on the front, rear, left, and right sides of the vehicle body can generate a bird's eye image seen from right above the vehicle body by converting and combining images captured by the monitoring cameras, and by displaying the bird's eye image on the display apparatus, it is possible to make it easier to monitor other vehicles from the boarding space of the administrator.

As one means for making the present invention more preferable, the driver's seat is provided with a supporting member that extends from a base plate of the driver's seat toward one of left and right side portions of the driver's seat, and an armrest that is supported by the supporting member, the supporting arm includes a first arm portion that extends from the supporting member toward a position that is forward of the armrest, passing under the armrest, and a second arm portion that extends from an extension end of the first arm portion toward a position that is forward and upward of the armrest, and the terminal apparatus is attached to an extension end of the second arm portion so as to be located above a front end of the armrest.

With this means, it is possible to provide the terminal apparatus at a position above the front end of the armrest without narrowing the area of the seat for the driver. The driver can easily operate the terminal apparatus with his/her arm on the side of the hand with which the driver operates the terminal apparatus, placed on the armrest.

That is to say, it is possible to improve the operability of the terminal apparatus in the work vehicle without degrading riding comfort for the driver on the driver's seat.

As one means for making the present invention more preferable, the terminal apparatus includes a clamp portion that is switchable to a clamping state in which the clamp portion clamps the extension end of the second arm portion and a released state in which the clamp portion is released from clamping, and is attached to the extension end of the second arm portion such that the position thereof can be changed in a top-bottom direction.

With this means, it is possible to easily change the height position of the terminal apparatus to an appropriate position according to the driver's physique and preference. As a result, it is possible to improve the operability of the terminal apparatus in the work vehicle and the visibility of content displayed on the terminal apparatus.

As one means for making the present invention more preferable, the outer periphery of the second arm portion is rounded, and the terminal apparatus is attached to the extension end of the second arm portion such that the orientation thereof can be adjusted in a direction around an axis of the second arm portion.

With this means, it is possible to easily change the orientation of the terminal apparatus to an appropriate orientation according to the driver's physique and preference. As a result, it is possible to improve the operability of the terminal apparatus in the work vehicle and the visibility of content displayed on the terminal apparatus.

BRIEF DESCRIPTION OF THE DRAWINGS

FIG. 8 is a front view of an upper portion of a cabin, showing the positions of the antenna of the communication module, and so on.

FIG. 9 is a rear view of the upper portion of the cabin, showing the positions of the antenna of the communication module, and so on.

FIG. 10 is a left side view of the upper portion of the cabin, showing the positions of the antenna of the communication module, and so on.

FIG. 12 is a perspective view of a main part, showing the positions of a communication information processing apparatus of the communication module, and so on.

FIG. 13 is a vertical cross-sectional front view of a main part, showing the positions of the communication information processing apparatus of the communication module, and so on.

BEST MODE FOR CARRYING OUT THE INVENTION

The following describes, as an example of a mode for carrying out the present invention, an embodiment in which the present invention is applied to a tractor, which is an example of a work vehicle, with reference to the drawings.

Figure 1:
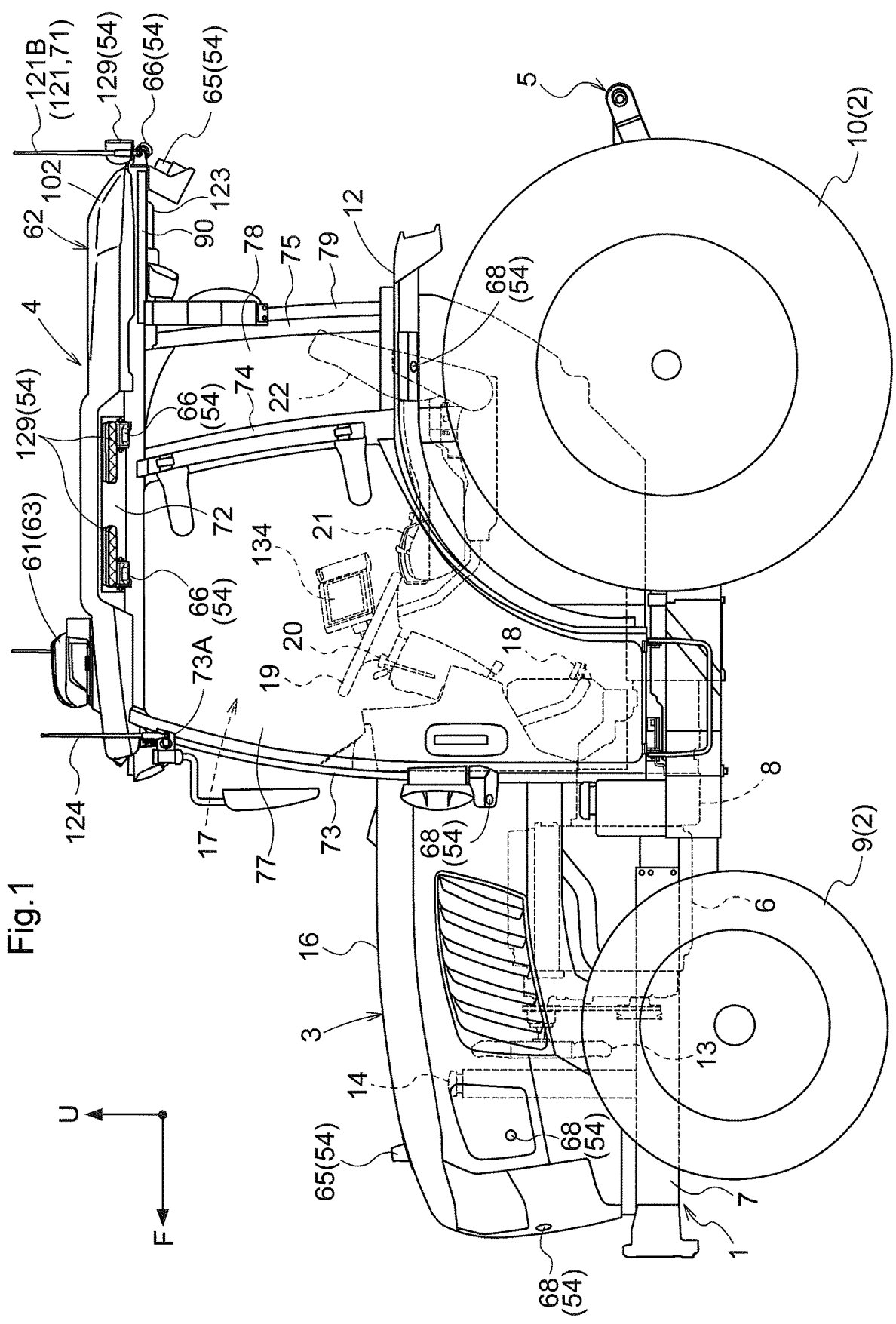
FIG. 1 is a left side view of a tractor, showing, for example, the position of an antenna of a communication module.

Note that the arrow with a reference sign F in FIG. 1 indicates the front side of the tractor, and the arrow with a reference sign U indicates the upper side of the tractor.

Figure 2:
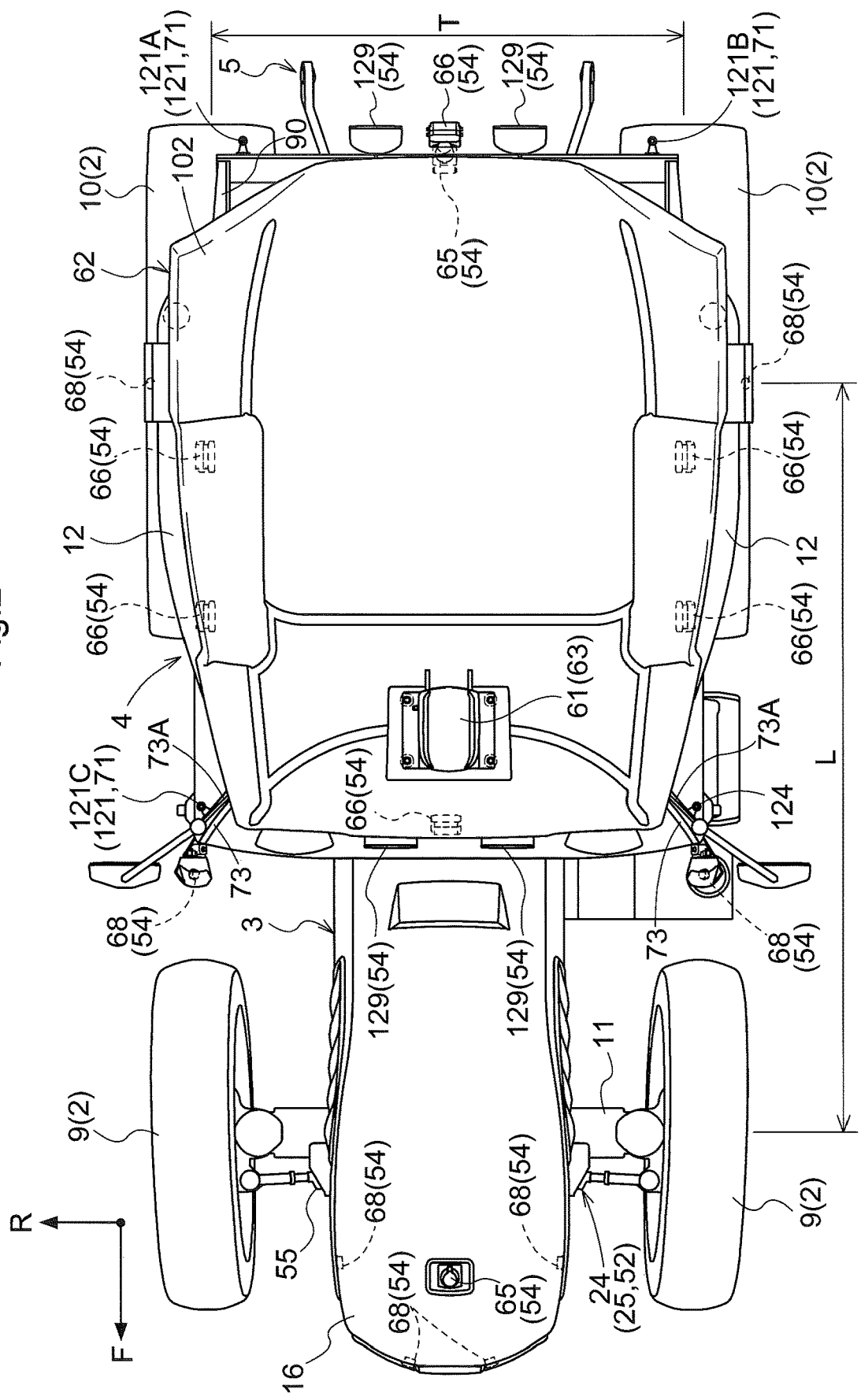
FIG. 2 is a plan view of the tractor, showing, for example, the position of the antenna of the communication module.

The arrow with a reference sign F in FIG. 2 indicates the front side of the tractor, and the arrow with a reference sign R indicates the right side of the tractor.

Figure 3:
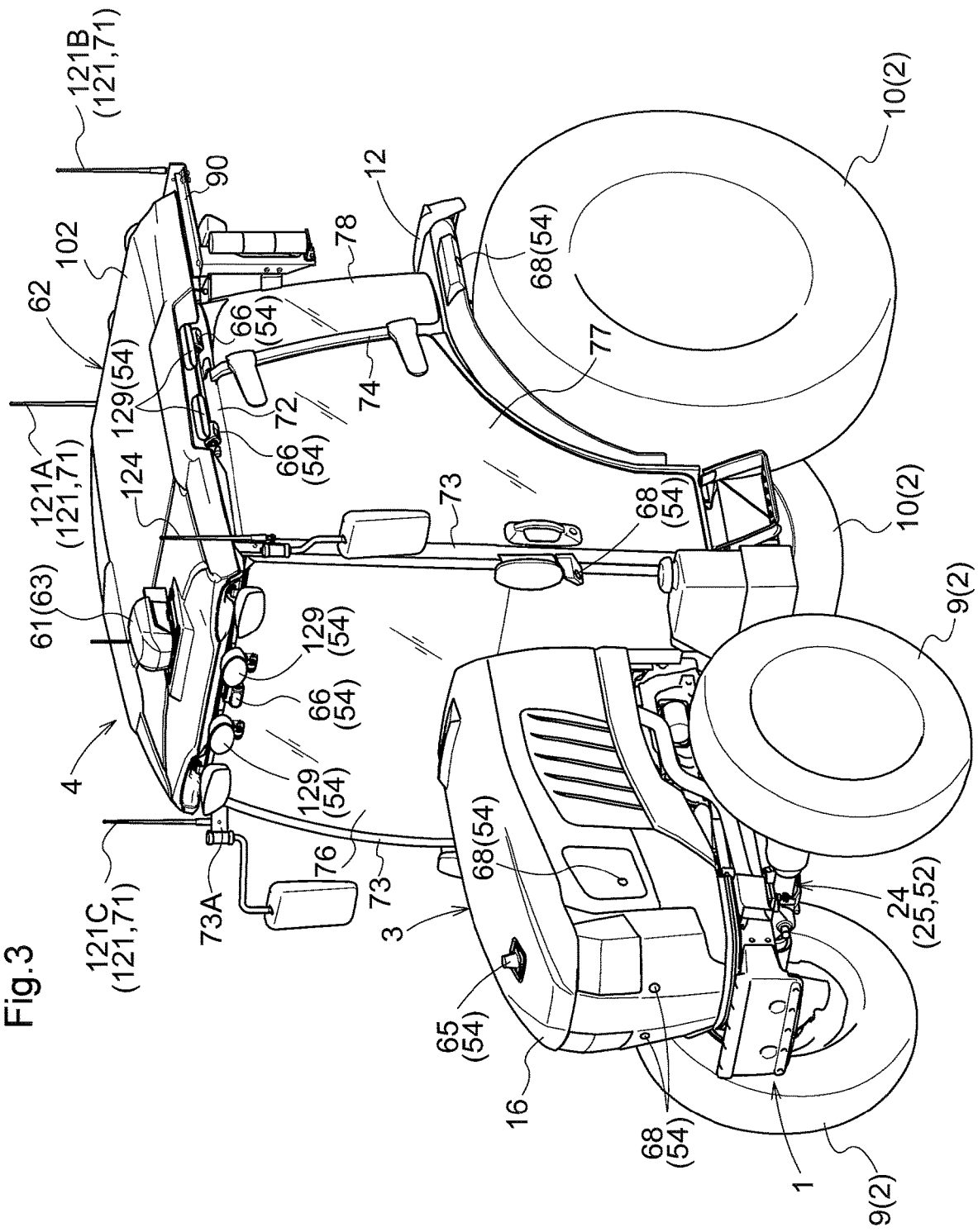
FIG. 3 is a perspective view of the tractor, showing, for example, the position of the antenna of the communication module.
Figure 4:
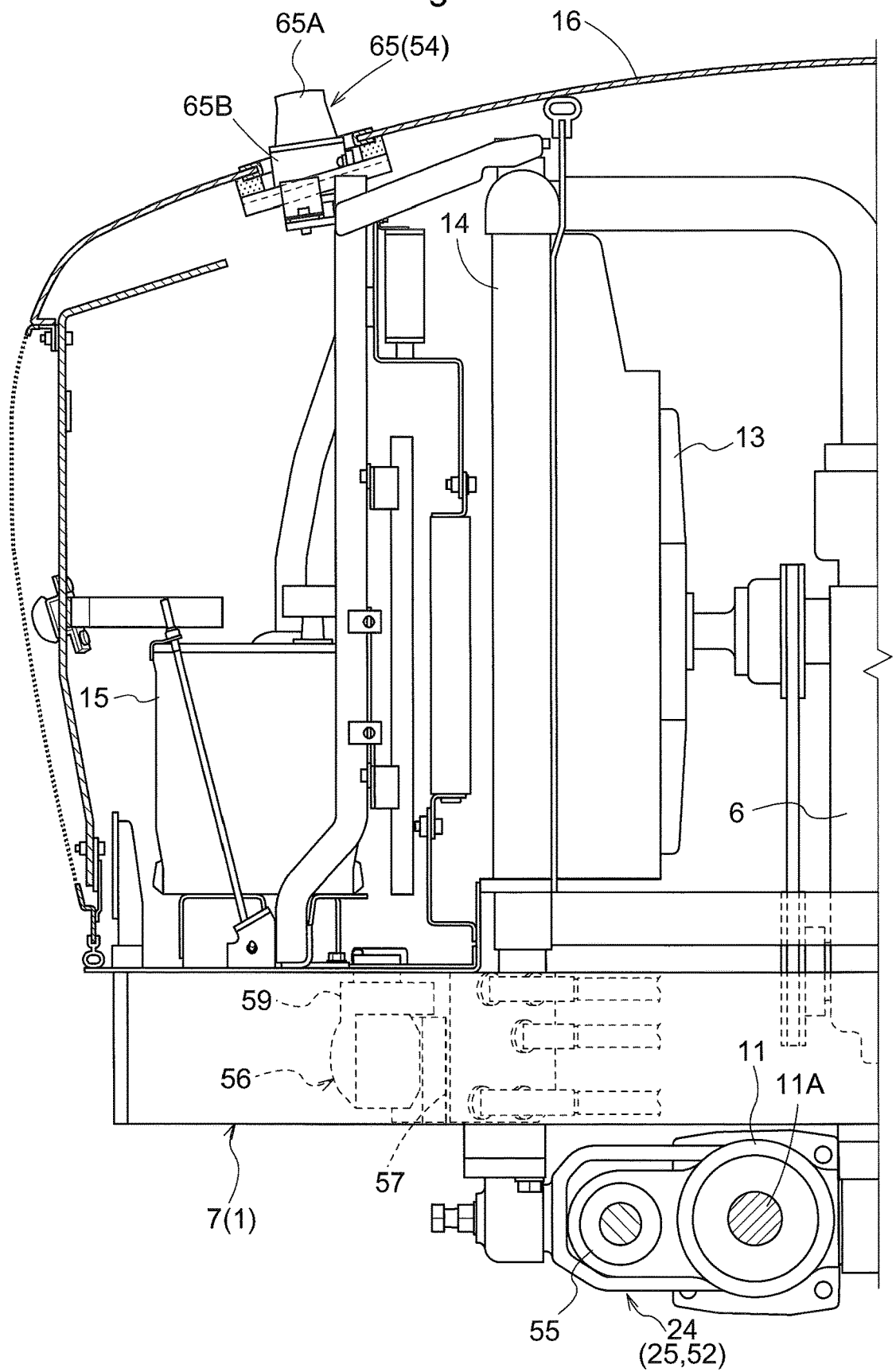
FIG. 4 is a vertical cross-sectional left side view of a main part showing a configuration of a front end portion of the tractor.
Figure 5:
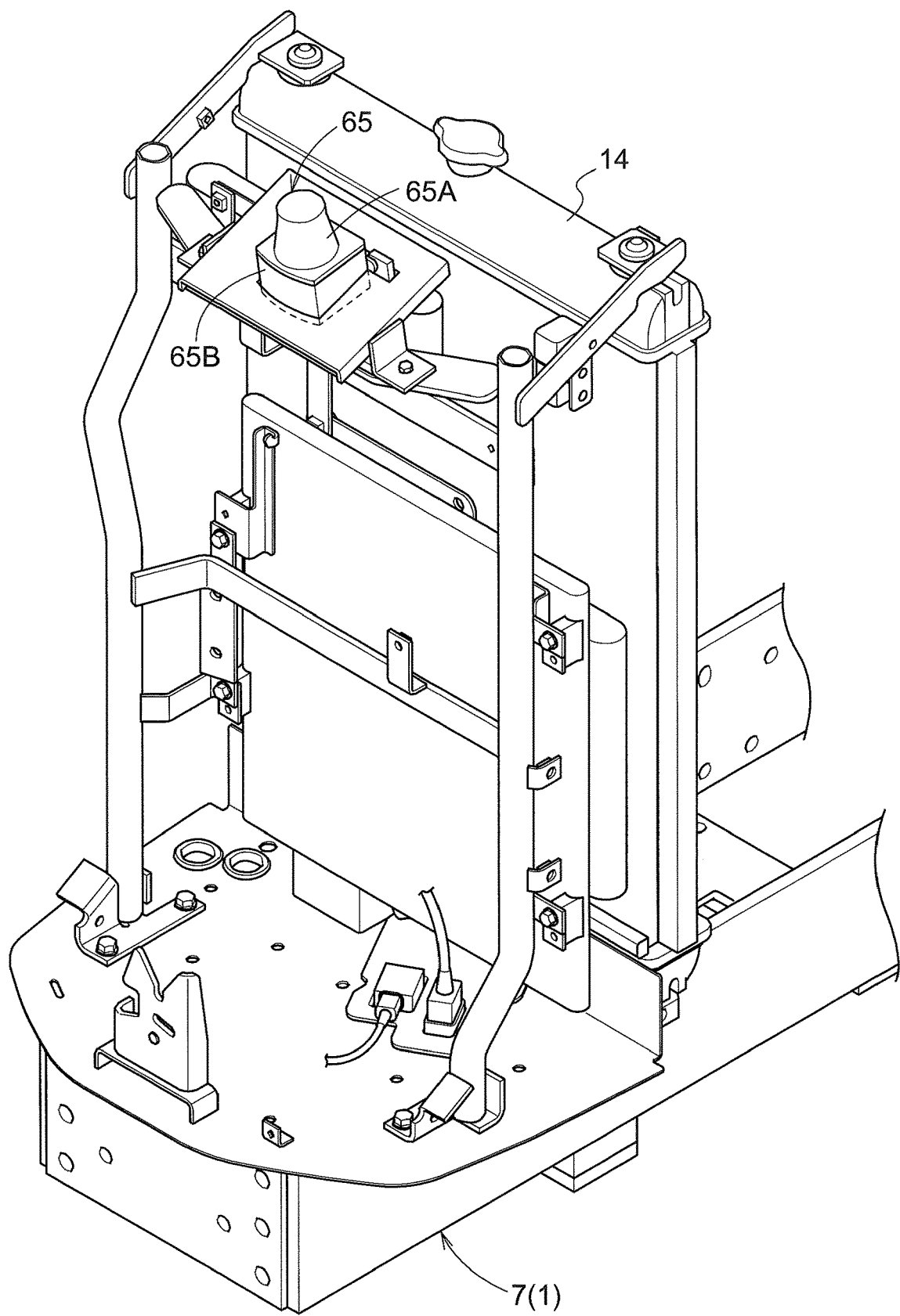
FIG. 5 is a perspective view of a main part showing the configuration of the front end portion of the tractor.

As shown in FIGS. 1 to 3, the tractor illustrated in the present embodiment includes, for example: a vehicle body frame 1 that spans between the front and rear ends of the vehicle body; left and right travel apparatuses 2 located on the left and right of the vehicle body frame 1; a prime mover part 3 that is located at a front portion of the vehicle body frame 1; a cabin 4 located at a rear portion of the vehicle body frame 1; and a three-point linkage mechanism 5 that is used to couple a work apparatus thereto and is attached to a rear end portion of the vehicle body frame 1 so as to be able to swing up and down.

As shown in FIGS. 1 to 5, 16, and 17, the vehicle body frame 1 includes, for example: a front frame 7 that extends from a position below an engine 6 located in the prime mover part 3 to the front side of the vehicle body; and a case unit 8 that also serves as a rear frame and extends from a position below the rear end of the engine 6 to the rear side of the vehicle body. Although not shown in the drawings, the case unit 8 houses, for example: a pedal-operation type main clutch that connects or disconnects power from the engine 6; a speed change power transmission unit that splits power transmitted via the main clutch into travel power and work power, and performs speed change; and left and right side brakes that affect the left and right travel apparatuses 2.

The left and right travel apparatuses 2 include left and right front wheels 9 that function as drivable and steerable wheels, and left and right rear wheels 10 that function as driving wheels. The left and right front wheels 9 are supported at the left and right ends of a wheel supporting member 11 that is rotatably supported by the front frame 7, so as to be drivable in a steerable state. The wheel supporting member 11 is a front wheel shaft case that houses, for example, a power transmission shaft 11A for driving the front wheels. The left and right rear wheels 10 are drivably supported by the case unit 8, and upper portions of the rear wheels 10 are covered by left and right rear fenders 12 that are located in a rear portion of the vehicle body.

The prime mover part 3 includes, for example: the water-cooled engine 6 located in a rear portion of the prime mover part 3 relative to the vehicle body, which is a downstream portion of the prime mover part 3 in a cooling direction; a cooling fan 13 located in a front portion of the vehicle body, which is located upstream of the engine 6 in the cooling direction; a radiator 14 that is located forward of the cooling fan 13 in the vehicle body; a battery 15; an exhaust processing apparatus (not shown) that is located above a rear portion of the engine 6; an air cleaner (not shown) that is located above a front portion of the engine 6; and a bonnet 16 that is swung open and closed and covers the engine 6, the radiator 14, and so on from above. An electronic control type diesel engine that is provided with a common rail system is employed as the engine 6. A DOC (Diesel Oxidation Catalyst) and a DPF (Diesel particulate filter) are provided in the exhaust processing apparatus.

As shown in FIGS. 1 to 4, 6, and 16 to 18, the cabin 4 is provided with a driver part 17 and a boarding space in a rear portion of the vehicle body. The driver part 17 includes, for example: a clutch pedal 18 that enables operation of the main clutch; left and right brake pedals 49 that enable operation of the left and right side brakes; a steering wheel 19 for manual steering that enables manual steering of the left and right front wheels 9; a shuttle lever 20 for switching to forward travel and rearward travel; a driver's seat 22 that has an armrest 21 for the right arm; and a display unit 23 that includes, for example, a liquid crystal panel 23A that accepts touch operations. The steering wheel 19 is linked to the left and right front wheels 9 via a steering mechanism 25 that includes a full hydraulic type power steering unit (hereinafter referred to as "a PS unit") 24. The armrest 21 is provided with a main shift lever 26, an up/down lever 27 for setting the height position of the work apparatus, and an up/down switch 28 for making an instruction to move the work apparatus up and down.

Figure 7:
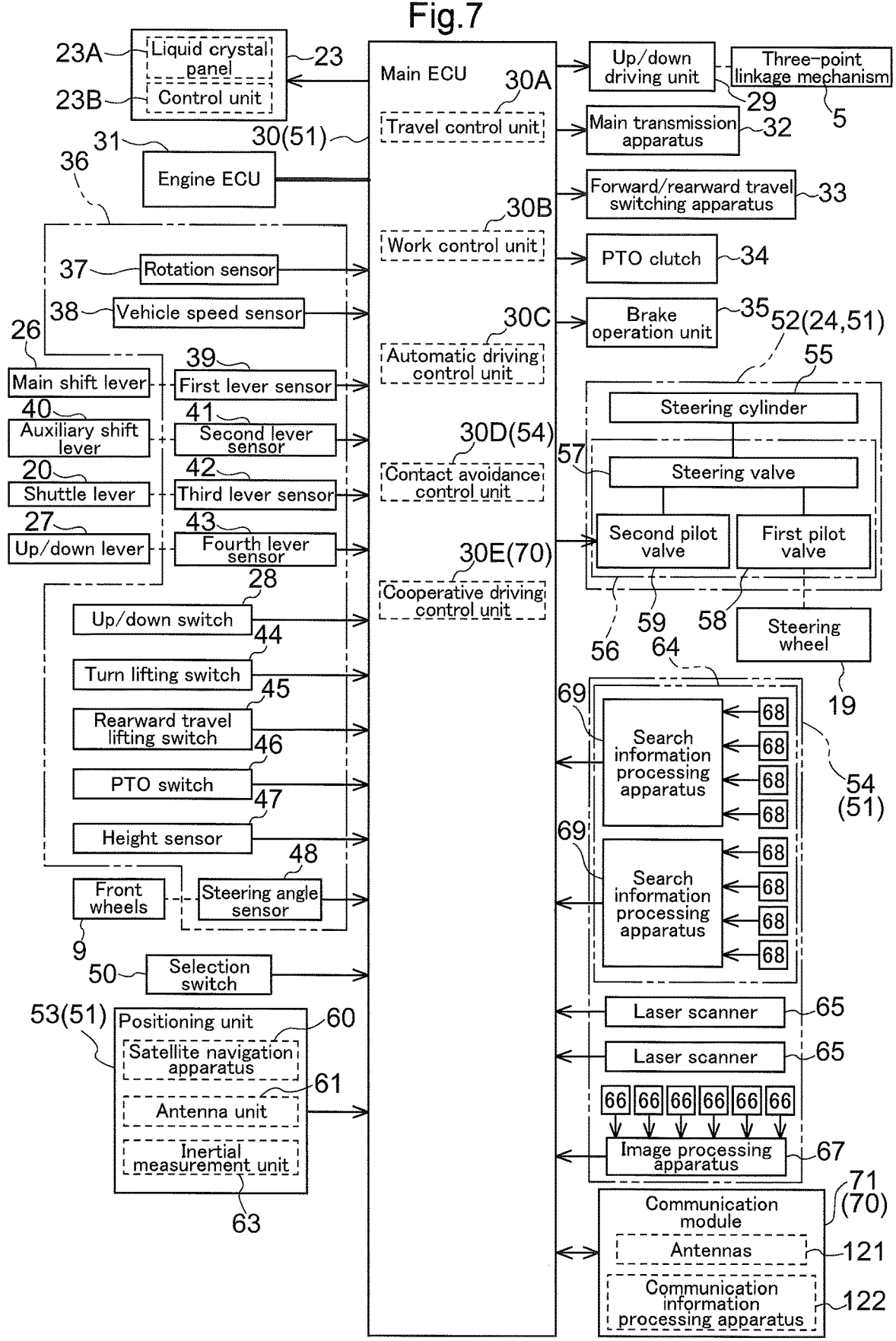
FIG. 7 is a block diagram showing an overall configuration of a control system.
Figure 8:
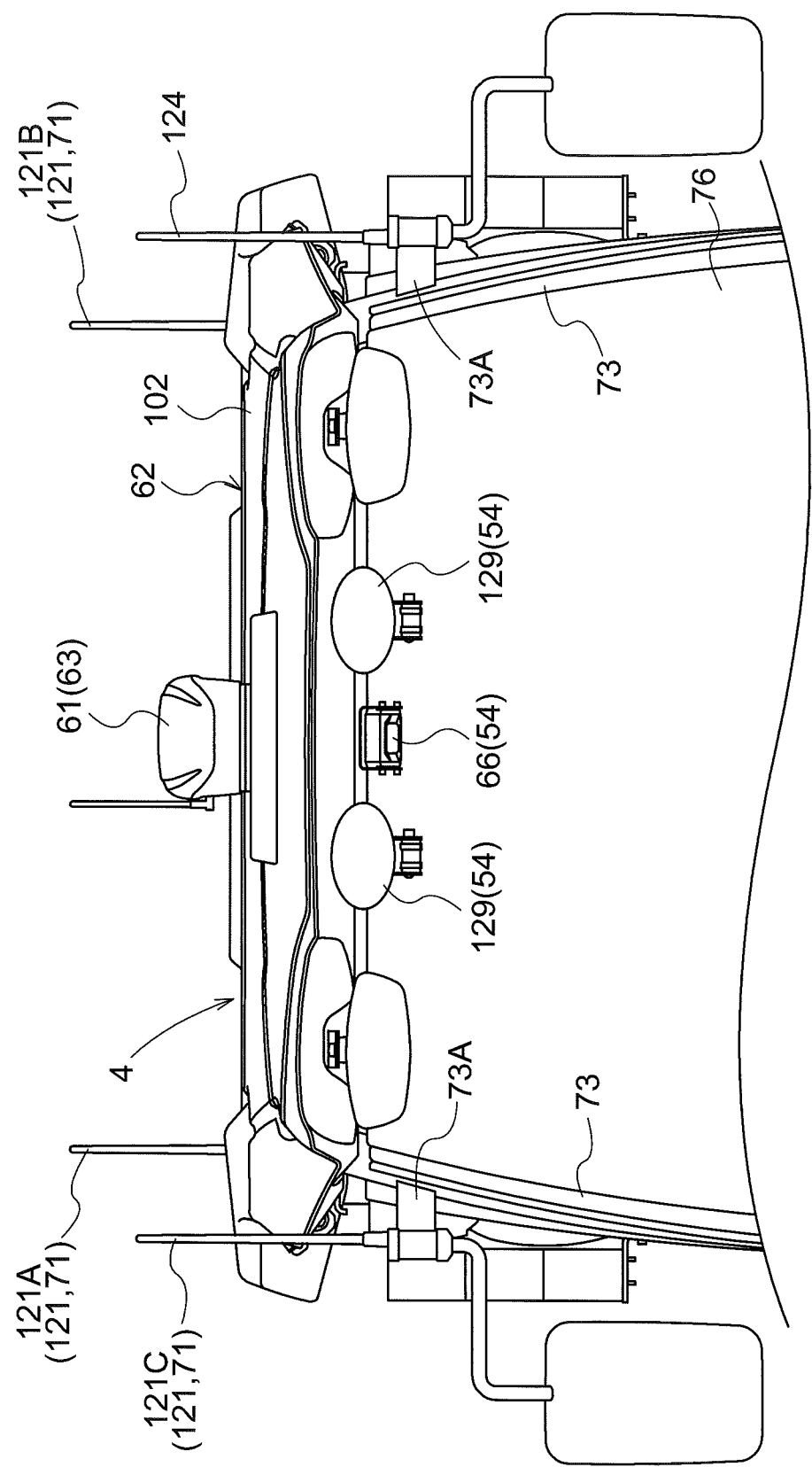
Figure 9:
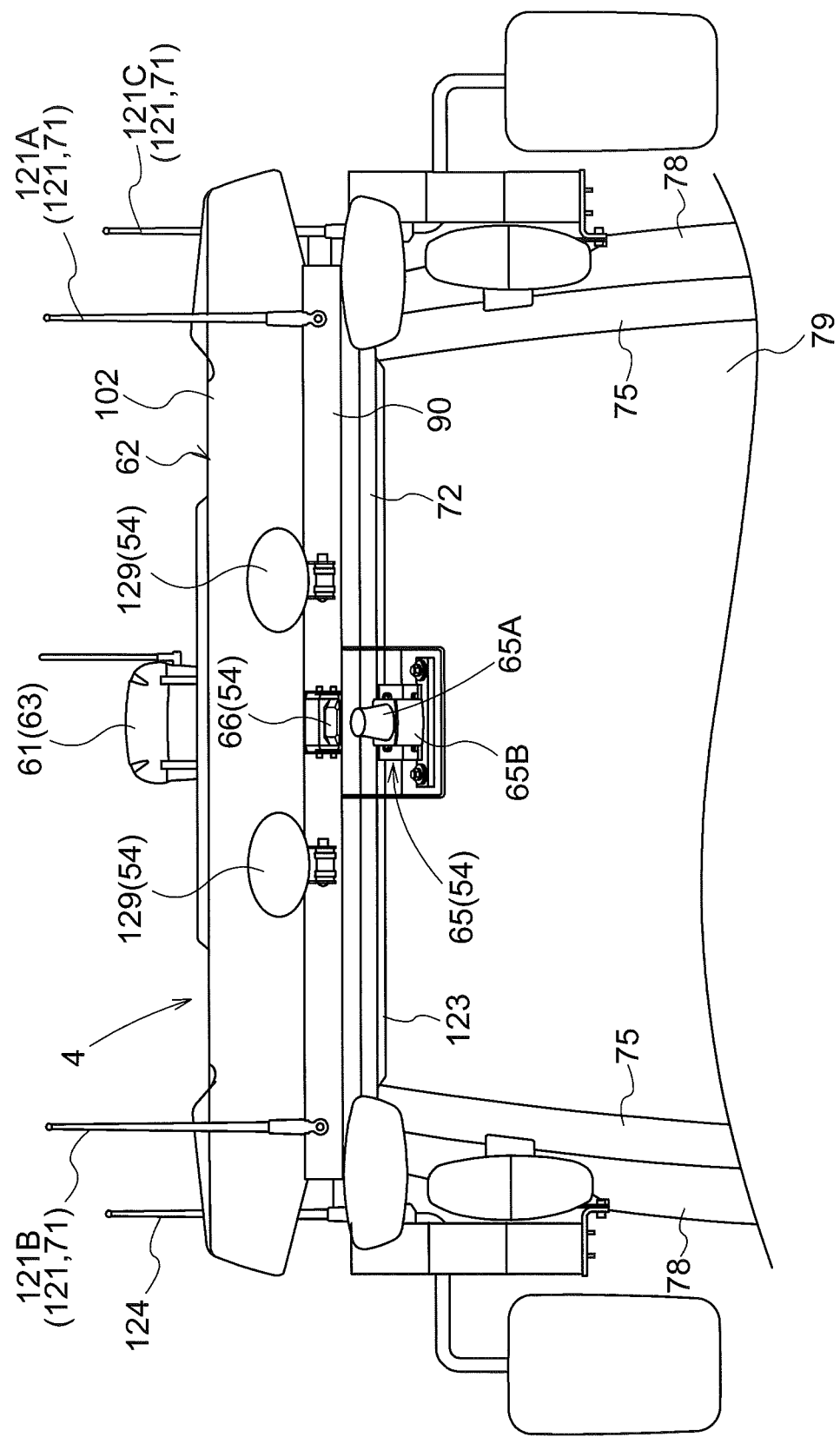
Figure 10:
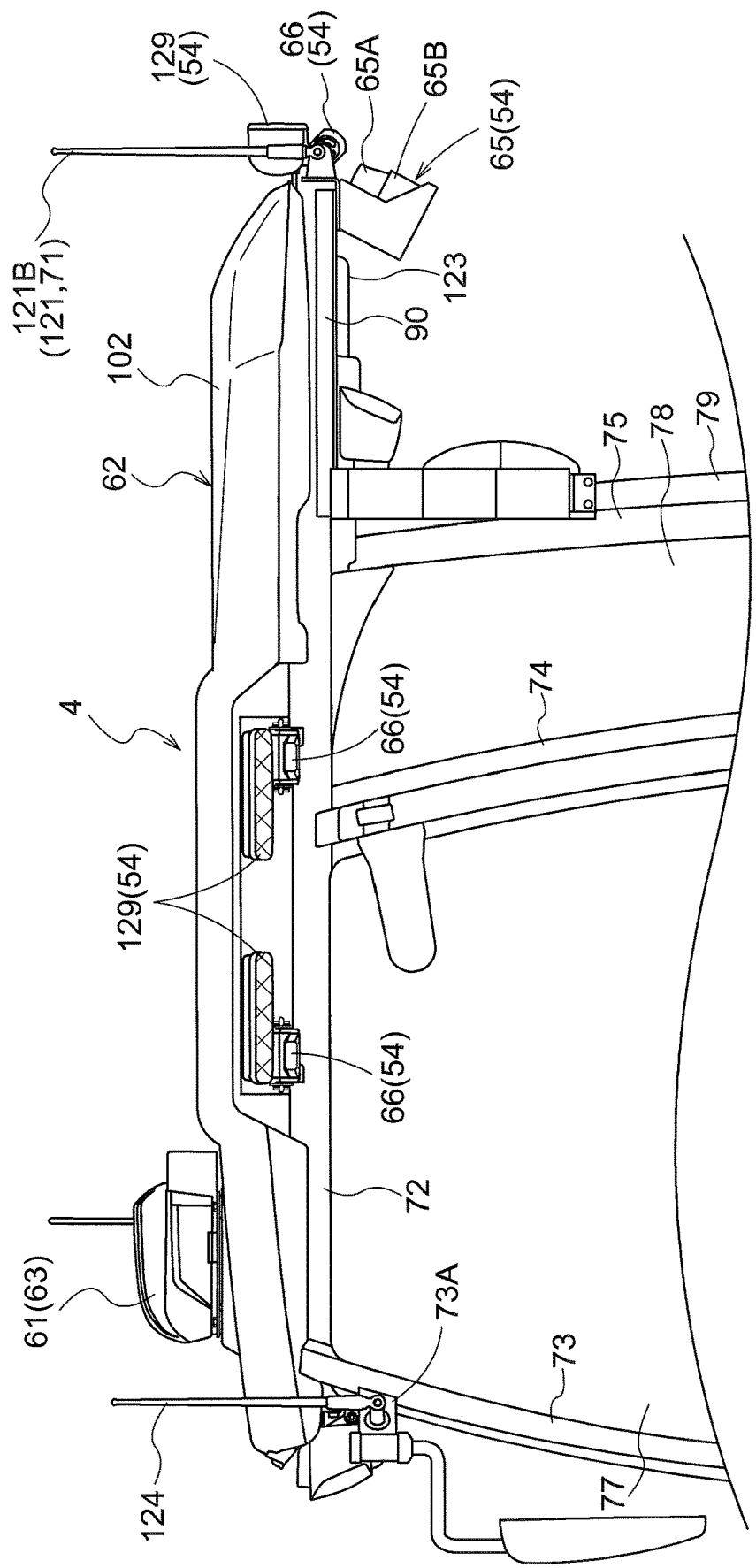
Figure 11:
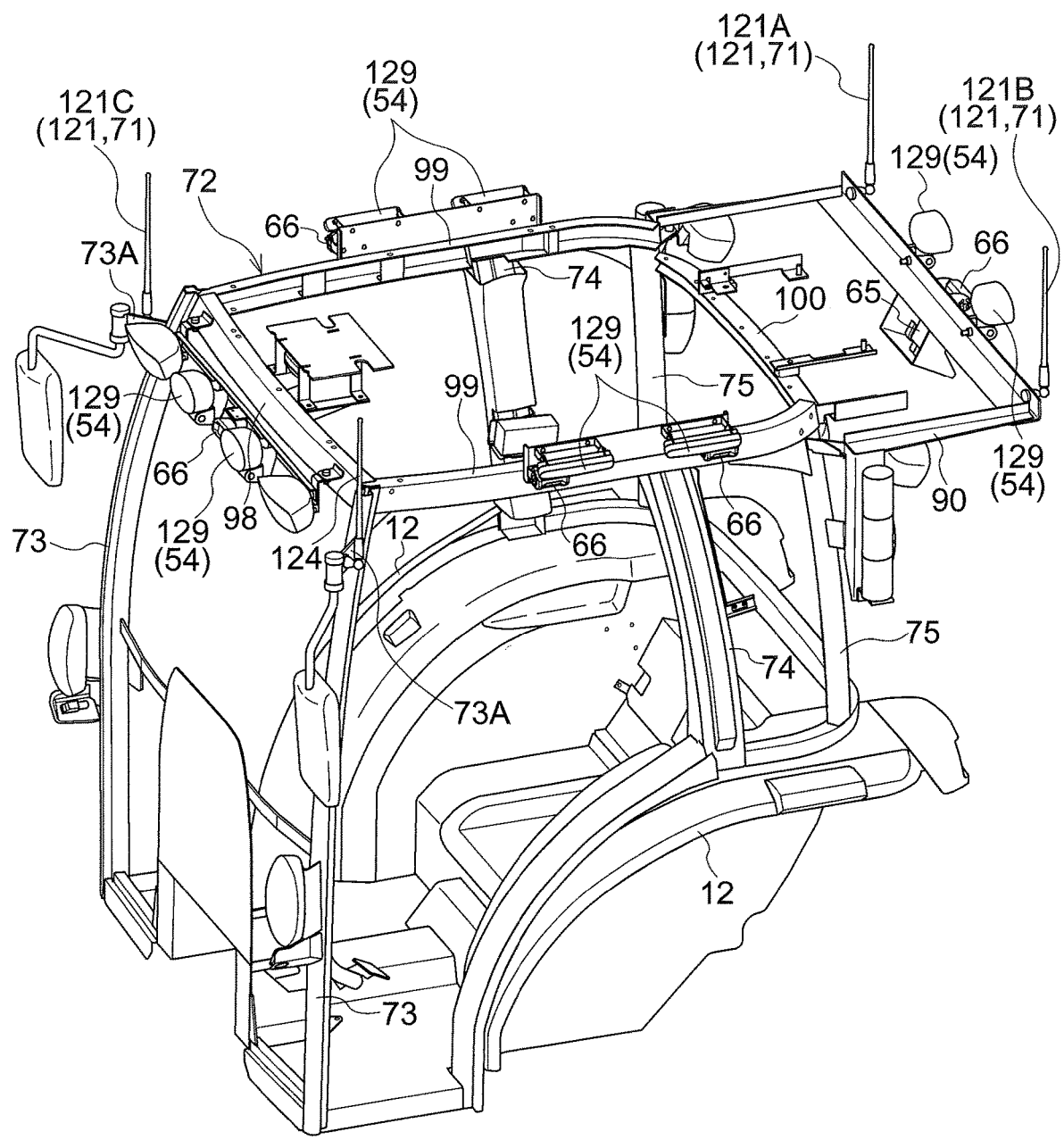
FIG. 11 is a perspective view of a main part, showing a frame structure of the cabin.

As shown in FIG. 7, the three-point linkage mechanism 5 is driven to swing in the top-bottom direction as a result of action of an electronic hydraulic control type up/down driving unit 29 provided in the vehicle body. Although not shown in the drawings, a work apparatus such as a rotary cultivating apparatus, a plow, a disc harrow, a cultivator, a subsoiler, a sowing apparatus, a spraying apparatus, or the like can be coupled to the three-point linkage mechanism 5. If a work apparatus coupled to the three-point linkage mechanism 5 is a rotary cultivating apparatus or the like that is driven by power from the vehicle body, work power taken from the shift unit is transmitted thereto via an external power transmission shaft.

A main electronic control unit (hereinafter referred to as "a main ECU") 30 that includes a travel control unit 30A that performs control regarding travel of the vehicle body, a work control unit 30B that controls control regarding the work apparatus, and so on is mounted on the vehicle body. The main ECU 30 is connected to the above-described electronic hydraulic control type up-down driving unit 29, an electronic control unit for the engine (hereinafter referred to as "an engine ECU") 31, an electronic control type main transmission apparatus 32, a forward/rearward travel switching apparatus 33, a PTO clutch 34 provided in the speed change power transmission unit, an electronic hydraulic type brake operation unit 35, an in-vehicle information acquisition unit 36 that acquires in-vehicle information including the vehicle speed, and so on via an in-vehicle LAN such as a CAN (Controller Area Network) or a communication line, so as to be able to communicate with them. The main ECU 30 and the engine ECU 31 include a microprocessor that includes a CPU, an EEPROM, and so on. The travel control unit 30A includes, for example, various control programs that realize control regarding the travel of the vehicle body. The travel control unit 30A includes, for example, various control programs that realize control regarding the travel of the vehicle body.

A hydraulic static continuously variable transmission apparatus that performs continuous speed change on travel power is employed as the main transmission apparatus 32. The forward/rearward travel switching apparatus 33 also serves as a travel clutch that connects or disconnects travel power. Although not shown in the drawings, the speed change power transmission unit includes, in addition to the main transmission apparatus 32 and so on, an auxiliary transmission apparatus that performs stepwise speed change on travel power, a PTO transmission apparatus that performs stepwise speed change on work power, and so on.

The in-vehicle information acquisition unit 36 includes various sensors and switches such as: a rotation sensor 37 that detects the output speed of the engine 6; a vehicle speed sensor 38 that detects the output speed of the auxiliary transmission apparatus as the vehicle speed; a first lever sensor 39 that detects the operation position of the main shift lever 26; a second lever sensor 41 that detects the operation position of an auxiliary shift lever 40 that is provided in the driver part 17; a third lever sensor 42 that detects the operation position of the shuttle lever 20; a fourth lever sensor 43 that detects the operation position of the up/down lever 27; the above-described up/down switch 28; a turn lifting switch 44, a rearward travel lifting switch 45, and a PTO switch 46 that are included in the driver part 17; a height sensor 47 that detects the angle of up/down swing of left and right lift arms (not shown) of the up/down driving unit 29 as the height position of the work apparatus; and a steering angle sensor 48 that detects the steering angle of the front wheels 9.

The travel control unit 30A performs vehicle speed control to operate a trunnion shaft (not shown) of the main transmission apparatus 32 based on the output from the rotation sensor 37, the output from the vehicle speed sensor 38, the output from the first lever sensor 39, and the output from the second lever sensor 41 such that the vehicle speed reaches a control target vehicle speed obtained based on the engine output speed, the operation position of the main shift lever 26, and the operation position of the auxiliary shift lever 40. Thus, the driver can change the vehicle speed to any vehicle speed by operating the main shift lever 26 to a certain operation position.

The travel control unit 30A performs forward/rearward travel switching control to switch the forward/rearward travel switching apparatus 33 to a power transmission state corresponding to the operation position of the shuttle lever 20, based on the output from the third lever sensor 42. Thus, the driver can set the travel direction of the vehicle body to the forward direction by operating the shuttle lever 20 to a forward travel position. Also, the driver can set the travel direction of the vehicle body to the rearward direction by operating the shuttle lever 20 to a rearward travel position.

The work control unit 30B performs position control to control the action of the up/down driving unit 29 based on the output from the fourth lever sensor 43 and the output from the height sensor 47, such that the work apparatus is located at the height position that corresponds to the operation position of the up/down lever 27. Thus, the driver can change the height position of the work apparatus to any height position by operating the up/down lever 27 to a certain operation position.

Upon the up/down switch 28 being switched to a lifting instruction state in response to the up/down switch 28 being manually operated, the work control unit 30B performs lifting control to control the action of the up/down driving unit 29 based on a lifting instruction from the up/down switch 28 and the output from the height sensor 47 such that the work apparatus is lifted to an upper limit position that has been determined in advance. Thus, the driver can make the work apparatus be automatically lifted to the upper limit position by switching the up/down switch 28 to the lifting instruction state.

Upon the up/down switch 28 being switched to a lowering instruction state in response to the up/down switch 28 being manually operated, the work control unit 30B performs lowering control to control the action of the up/down driving unit 29 based on a lowering instruction from the up/down switch 28, the output from the fourth lever sensor 43, and the output from the height sensor 47 such that the work apparatus is lowered to a work height position that has been set using the up/down lever 27. Thus, the driver can make the work apparatus be automatically lowered to the work height position by switching the up/down switch 28 to the lowering instruction state.

When execution of turn-conjunctive lifting control is selected in response to the turn lifting switch 44 being manually operated, the work control unit 30B automatically performs the above-described lifting control upon detecting that the steering angle of the front wheels 9 has reached a set angle for a ridge edge turn based on the output from the steering angle sensor 48 that detects the steering angle of the front wheels 9. Thus, by selecting execution of turn-conjunctive lifting control in advance, the driver can make the work apparatus be automatically lifted to the upper limit position in conjunction with the start of a ridge edge turn.

When execution of rearward travel-conjunctive lifting control is selected in response to the rearward travel lifting switch 45 being manually operated, the work control unit 30B automatically performs the above-described lifting control upon detecting that the shuttle lever 20 has been manually operated to the rearward travel position based on the output from the third lever sensor 42. Thus, by selecting execution of rearward travel-conjunctive lifting control in advance, the driver can enable the work apparatus to be automatically lifted to the upper limit position in conjunction with switching to rearward travel.

Upon the PTO switch 46 being manually operated and switched to an ON position, the work control unit 30B performs clutch ON control to switch the PTO clutch 34 to an ON position based on the switching of the PTO switch 46 to the ON position so that work power is transmitted to the work apparatus. Thus, the driver can activate the work apparatus by operating the PTO switch 46 to the ON position.

Upon the PTO switch 46 being manually operated and switched to an OFF position, the work control unit 30B performs clutch OFF control to switch the PTO clutch 34 to an OFF position based on the switching of the PTO switch 46 to the OFF position so that work power is not transmitted to the work apparatus. Thus, the driver can stop the work apparatus by operating the PTO switch 46 to the OFF position.

Upon the PTO switch 46 being manually operated and switched to an automatic position, the work control unit 30B automatically performs the above-described clutch OFF control in conjunction with execution of the above-described lifting control, or automatically performs the above-described clutch ON control in conjunction with execution of the above-described lowering control. Thus, by operating the PTO switch 46 to the automatic position in advance, the driver can stop the work apparatus in conjunction with the automatic lifting of the work apparatus to the upper limit position, or activate the work apparatus in conjunction with the automatic lowering of the work apparatus to the work height position.

As shown in FIGS. 1 to 5, 7, and 16 to 18, the tractor includes a selection switch 50 that enables the driver to select a manual driving mode or an automatic driving mode as a driving mode, and an electronic control system 51 for automatic driving that automatically drives the vehicle body when the automatic driving mode is selected. The electronic control system 51 includes, for example: the above-described main ECU 30; an automatic steering unit 52 that realizes automatic steering of the left and right front wheels 9; a positioning unit 53 that measures the position and orientation of the vehicle body; and a monitoring unit 54 that monitors the surroundings of the vehicle body.

As shown in FIGS. 2 to 4, 7, and 16 to 18, the automatic steering unit 52 is constituted by the above-described PS unit 24. When the manual driving mode is selected, the PS unit 24 steers the left and right front wheels 9 based on an operation performed to rotate the steering wheel 19. When the automatic driving mode is selected, the PS unit 24 steers the left and right front wheels 9 based on a control instruction from the main ECU 30.

The PS unit 24 includes a hydraulic double-acting steering cylinder 55 that is linked to the left and right front wheels 9, and an oil pressure control unit 56 that controls oil pressure that is applied to the steering cylinder 55. The oil pressure control unit 56 includes a pilot type steering valve 57 that controls the flow of oil to the steering cylinder 55, a manual type first pilot valve 58 that controls the pilot flow amount for the steering valve 57 according to the amount of operation performed to rotate the steering wheel 19, and an electric type second pilot valve 59 that controls the pilot flow amount for the steering valve 57 based on a control instruction from the main ECU 30.

With the above-described configuration, when the manual driving mode is selected, the occupant can steer the left and right front wheels 9 using light operating force via the PS unit 24 by performing an operation to rotate the steering wheel 19. When the automatic driving mode is selected, the PS unit 24 operates based on a control instruction from the main ECU 30, and the left and right front wheels 9 are automatically steered in an appropriate manner.

That is to say, it is possible to automatically steer the left and right front wheels 9 without providing a steering unit that is dedicated to automatic steering. Also, if a failure occurs in the electrical system of the PS unit 24, the occupant can easily switch to manual steering and continue driving the vehicle body.

As shown in FIGS. 1 to 3 and 7 to 10, the positioning unit 53 includes a satellite navigation apparatus 60 that measures the position and orientation of the vehicle body using a well-known GPS (Global Positioning System), which is an example of a GNSS (Global Navigation Satellite System). Positioning methods using a GPS include a DGPS (Differential GPS) method and an RTK-GPS (Real Time Kinematic GPS) method, for example. In the present embodiment, an RTK-GPS (Real Time Kinematic GPS) method, which is suitable for positioning a moving object, is employed.

The satellite navigation apparatus 60 includes a satellite navigation antenna unit 61 that receives radio waves transmitted from a GPS satellite (not shown) and positioning data transmitted from a reference station (not shown) located at a known position. The reference station transmits positioning data obtained by receiving radio waves from a GPS satellite, to the satellite navigation apparatus 60. The satellite navigation apparatus 60 obtains the position and orientation of the vehicle body based on positioning data obtained by receiving radio waves from the GPS satellite, and positioning data from the reference station.

The antenna unit 61 is attached to a roof 62 of the cabin 4, which is located at the top of the vehicle body so as to increase sensitivity when receiving radio waves from the GPS satellite. Therefore, the position and the orientation of the vehicle body measured using the GPS include positioning errors due to displacement of the antenna unit 61 resulting from yawing, pitching, or rolling of the vehicle body.

Therefore, the vehicle body is provided with an IMU (Inertial Measurement Unit) 63 that includes a three-axis gyroscope (not shown) and a three-direction acceleration sensor (not shown), and measures the yaw angle, pitch angle, and roll angle of the vehicle body so that correction can be performed to eliminate the above-described positioning errors. The IMU 63 the above-described antenna unit 61 can be easily obtained. The antenna unit 61 is attached to a midpoint, in the left-right direction, of the upper surface of a front portion of the roof 62 of the cabin 4 such that the antenna unit 61 is located at a midpoint of a track T and a midpoint of a wheelbase L of the vehicle body in plan view (see FIG. 2).

With the above-described configuration, at least in plan view, the position at which the IMU 63 is attached is close to the position of the center of gravity of the vehicle body. As a result, it is possible to easily perform calculation for correcting the yaw angle and so on measured by the IMU 63, based on the amount of displacement of the IMU 63 from the position of the center of gravity of the vehicle body, and thus it is possible to swiftly and correctly correct the result of measurement performed by the IMU 63. That is to say, the IMU 63 can swiftly and accurately measure the yaw angle and so on of the vehicle body.

With the above-described configuration, at least in plan view, the position at which the IMU 63 is attached is close to the position of the center of gravity of the vehicle body. As a result, it is possible to easily perform calculation for correcting the yaw angle and so on measured by the IMU 63, based on the amount of displacement of the IMU 63 from the position of the center of gravity of the vehicle body, and thus it is possible to swiftly and correctly correct the result of measurement performed by the IMU 63. That is to say, the IMU 63 can swiftly and accurately measure the yaw angle and so on of the vehicle body.

As a result, when the satellite navigation apparatus 60 measures the position and orientation of the vehicle body, if the antenna unit 61 is displaced due to yawing, pitching, or rolling of the vehicle body, it is possible to swiftly and accurately obtain the amount of displacement of the antenna unit 61 in such a case, based on, for example, the yaw angle, pitch angle, and roll angle of the vehicle body measured by the IMU 63. Then, it is possible to swiftly and accurately obtain positioning errors included in the position and orientation of the vehicle body measured by the satellite navigation apparatus 60, resulting from displacement of the antenna unit 61, based on the amount of displacement of the antenna unit 61 that can be obtained from the result of measurement performed by the IMU 63, and it is possible to swiftly and appropriately perform correction to eliminate the positioning errors from the result of measurement performed by the satellite navigation apparatus 60.

As a result, it is possible to easily, swiftly, and accurately measure the position and orientation of the vehicle body using GNSS.

As shown in FIG. 7, the main ECU 30 includes an automatic driving control unit 30C that includes various control programs that realize automatic driving of the vehicle body. The automatic driving control unit 30C transmits various control instructions to the travel control unit 30A, the work control unit 30B, and so on at appropriate points in time so that the vehicle body automatically travels along a preset target travel path on a farm field at a set speed while appropriately performing work, based on, for example, the target travel path and the result of positioning performed by the positioning unit 53. The travel control unit 30A controls the operations of the main transmission apparatus 32, the forward/rearward travel switching apparatus 33, and so on by transmitting various control instructions to the main transmission apparatus 32, the forward/rearward travel switching apparatus 33, and so on at appropriate points in time, based on various control instructions from the automatic driving control unit 30C, various pieces of information acquired by the in-vehicle information acquisition unit 36, and so on. The work control unit 30B controls the operations of the up/down driving unit 29, the PTO clutch 34, and so on by transmitting various control instructions to the up/down driving unit 29, the PTO clutch 34, and so on at appropriate points in time, based on various control instructions from the automatic driving control unit 30C, various pieces of information acquired by the in-vehicle information acquisition unit 36, and so on.

The target travel path may be a travel path along which the vehicle travelled during task travel while being manually driven in a farm field, the start point of a ridge edge turn, and so on that have been converted into data based on, for example, the result of positioning performed by the positioning unit 53. Alternatively, the target travel path may be a travel path along which the vehicle travelled during teaching travel r manual driving in a farm field, the start point of a ridge edge turn, and so on that have been converted into data based on, for example, the result of positioning performed by the positioning unit 53.

As shown in FIGS. 1 to 5 and 7 to 10, the monitoring unit 54 includes, for example: an obstacle detection module 64 that detects the presence or absence of an obstacle within an immediate range (e.g. within 1 m) of the vehicle body; front and rear obstacle detectors 65 that detect an approaching obstacle within a short range (e.g. within 10 m) of the vehicle body; a contact avoidance control unit 30D that performs contact avoidance control to avoid coming into contact with an obstacle; six monitoring cameras 66 that capture the surroundings of the vehicle body; and an image processing apparatus 67 that processes images captured by the monitoring cameras 66.

The obstacle detection module 64 includes eight obstacle searchers 68 that search for an obstacle within the immediate range of the vehicle body, and two search information processing apparatuses 69 that perform determination processing regarding whether or not an obstacle has approached and entered the immediate range of the vehicle body based on search information from each of the obstacle searcher 68.

A sonar device 68 that uses ultrasonic waves to measure a distance, which is an example of a range sensor, is employed in each obstacle searcher 68. Eight sonar devices 68 are distributed on the front end portion and the left and right end portions such that the front side and the left and right sides of the vehicle body are search-target areas. Each sonar device 68 transmits search information obtained by performing a search to the search information processing apparatus 69 corresponding thereto.

Each search information processing apparatus 69 performs determination processing to determine whether or not an obstacle has approached and entered the immediate range of the vehicle body based on the period from transmission to reception of an ultrasonic wave from the sonar device 68 corresponding to the search information processing apparatus 69, and outputs the result of determination to the contact avoidance control unit 30D.

As a result, when an obstacle has approached and entered the immediate range of the vehicle body from the front side or the left or right sides of the vehicle body during automatic driving, the obstacle detection module 64 detects the approaching obstacle. Also, a sonar device 68 is not provided at a rear end portion of the vehicle body, and therefore the obstacle detection module 64 is prevented from misdetecting the work apparatus attached to the rear end of the vehicle body so as to be able to move up and down, as an obstacle.

When the vehicle body is travelling toward a ridge during automatic driving, or when the vehicle body is travelling along a ridge at a ridge edge, if the ridge has unexpectedly entered the immediate range, the obstacle detection module 64 detects the ridge as an obstacle. Also, when a moving object has unexpectedly approached and entered the immediate range, the obstacle detection module 64 detects the moving object as an obstacle.

A laser scanner 65 that has a detection angle of approximately 270 degrees is employed as each obstacle detector 65. Each laser scanner 65 includes a search unit 65A that searches for an obstacle and a processing unit 65B that processes search information from the search unit 65A. The search unit 65A irradiates a search-target area with a laser beam and receives the reflected light. The processing unit 65B determines whether or not an obstacle has approached and entered a short range of the vehicle body, for example, based on the period from irradiation to reception of the laser beam, and outputs the result of determination to the contact avoidance control unit 30D. The search-target area of the laser scanner 65 on the front side is set to be an area that is forward of the vehicle body. The search-target area of the laser scanner 65 on the rear side is set to be an area that is rearward of the vehicle body.

The contact avoidance control unit 30D includes, for example, a control program that realizes execution of contact avoidance control, and is provided in the main ECU 30. Upon detecting that an obstacle has approached and entered the short range of the vehicle body based on the result of determination performed by each laser scanner 65, the contact avoidance control unit 30D preferentially performs contact avoidance control compared to automatic driving that is based on control operations performed by the automatic driving control unit 30C. Thereafter, the contact avoidance control unit 30D performs contact avoidance control based on the result of determination performed by each laser scanner 65 and each search information processing apparatus 69.

In contact avoidance control, the contact avoidance control unit 30D outputs a deceleration instruction to the travel control unit 30A upon contact avoidance control starting. Thus, the contact avoidance control unit 30D causes the main transmission apparatus 32 to perform a deceleration operation through a control operation performed by the travel control unit 30A, thereby reducing the vehicle speed from a set speed for normal travel to a set speed for contact avoidance. In this low-speed travel state, if the contact avoidance control unit 30D confirms that an obstacle has approached and entered the immediate range of the vehicle body based on the result of determination by any of the search information processing apparatuses 69, the contact avoidance control unit 30D outputs an emergency stop instruction to the travel control unit 30A and the work control unit 30B. As a result, the contact avoidance control unit 30D switches the forward/rearward travel switching apparatus 33 to the neutral state through a control operation performed by the travel control unit 30A, while causing the brake operation unit 35 to activate the left and right brakes to brake the left and right front wheels 9 and the left and right rear wheels 10. Also, the contact avoidance control unit 30D causes the work control unit 30B to switch the PTO clutch 34 to an OFF state to stop the action of the work apparatus. As a result, it is possible to swiftly stop the vehicle body from travelling and stop the work apparatus from operating, based on the fact that an obstacle has approached and entered the immediate range of the vehicle body, and it is possible to avoid the risk of an obstacle coming into contact with the vehicle body. In this low-speed travel state, upon confirming that there is no obstacle within the short range of the vehicle body based on the result of determination by each laser scanner 65, the contact avoidance control unit 30D outputs an acceleration instruction to the travel control unit 30A, and thereafter ends contact avoidance control. Thus, the contact avoidance control unit 30D causes the main transmission apparatus 32 to perform an acceleration operation through a control operation performed by the travel control unit 30A so that the vehicle speed is increased from the set speed for contact avoidance to the preset speed for normal travel, and thereafter restarts automatic driving that is based on a control operation performed by the automatic driving control unit 30C.

As shown in FIGS. 1 to 3 and 7 to 10, a wide-angle CCD camera for visible light is employed as each monitoring camera 66. One of the six monitoring cameras 66 is for capturing an image of objects on the front side of the vehicle body. This monitoring camera 66 is provided on the front end of the upper end portion of the cabin 4 at a central position in the left-right direction, in an inclined orientation so as to capture an image forward and downward thereof. Two of the monitoring cameras 66 are for capturing an image of objects that are located to the right of the vehicle body. These monitoring cameras 66 are provided at the right end of the upper end portion of the cabin 4 with a predetermined interval in the front-rear direction, in an inclined orientation so as to capture an image downward and to the right thereof. Two of the monitoring cameras 66 are for capturing an image of objects that are located to the left of the vehicle body. These monitoring cameras 66 are provided at the left end of the upper end portion of the cabin 4 with a predetermined interval in the front-rear direction, in an inclined orientation so as to capture an image downward and to the left thereof. One of the six monitoring cameras 66 is for capturing an image of objects on the rear side of the vehicle body. This monitoring camera 66 is provided on the rear end of the upper end portion of the cabin 4 at a central position in the left-right direction, in an inclined orientation so as to capture an image rearward and downward thereof. As a result, it is possible to capture images of the entire surroundings of the vehicle body.

Note that only one right monitoring camera 66 and only one left monitoring camera 66 may be provided at appropriate positions on the left and right end of the upper end portion of the cabin 4.

The image processing apparatus 67 processes video signals from the monitoring cameras 66, generates an image of objects on the front side of the vehicle body, an image of objects located to the right of the vehicle body, an image of objects located to the left of the vehicle body, an image of objects on the rear side of the vehicle body, a bird's eye image seen from right above the vehicle body, and so on, and transmits the images to the display unit 23 and so on. The display unit 23 includes, for example, a control unit 23B that changes an image displayed on the liquid crystal panel 23A, based on, for example, a manual operation made with various operation switches (not shown) displayed on the liquid crystal panel 23A.

With the above-described configuration, during manual driving, displaying images from the image processing apparatus 67 on the liquid crystal panel 23A makes it easier for the driver to visually check the state of the surroundings of the vehicle body and the state of work. Thus, the driver can easily drive the vehicle body in a preferable manner according to the type of work, and so on. Also, during automatic driving, when an administrator rides in the vehicle body, displaying images from the image processing apparatus 67 on the liquid crystal panel 23A makes it easier for the administrator to visually check the state of the surroundings of the vehicle body and the state of work during automatic driving. If the administrator visually recognizes an abnormality in the surroundings of the vehicle body, the state of work, or the like during automatic driving, the administrator can swiftly and appropriately address the abnormality according to the type of abnormality, the degree of the abnormality, and so on.

As shown in FIG. 7, the electronic control system 51 includes a cooperation control unit 70 that, when a cooperative driving mode is selected by manually operating the selection switch 50, causes the vehicle body to automatically drive in cooperation with another vehicle that has the same specifications. The cooperation control unit 70 includes a communication module 71 that wirelessly communicates with another vehicle to exchange information regarding cooperative travel with the other vehicle, including information regarding the positions of the vehicle bodies, with each other, and a cooperative driving control unit 30E that performs cooperative driving control based on information from the other vehicle. The cooperative driving control unit 30E includes, for example, a control program that realizes execution of cooperative driving control, and is provided in the main ECU 30.

In the cooperative driving mode, the automatic driving control unit 30C transmits various control instructions to the travel control unit 30A, the work control unit 30B, and so on at appropriate points in time so that the vehicle body automatically travels along a preset target travel path for side-by-side travel at a set speed while appropriately performing work, based on, for example, the target travel path for side-by-side travel and the result of positioning performed by the positioning unit 53. The cooperative driving control unit 30E determines whether or not the distance between the vehicle and another preceding vehicle in the forward travel direction, the distance between the vehicle and the other preceding vehicle in the side-by-side direction, and so on are appropriate, based on the target travel path for side-by-side travel of the vehicle, the result of positioning performed by the positioning unit 53, the target travel path for side-by-side travel of the other vehicle, position information regarding the other vehicle, and so on. If any of the distances between the vehicles is inappropriate, the cooperative driving control unit 30E preferentially restarts cooperative driving control compared to automatic driving that is based on the control operation made by the automatic driving control unit 30C, so that the distance between the vehicles is appropriate.

In cooperative driving control, if the distance between the vehicles in the forward travel direction is shorter than an appropriate distance, the cooperative driving control unit 30E outputs a deceleration instruction to the travel control unit 30A. Thus, the cooperative driving control unit 30E causes the main transmission apparatus 32 to perform a deceleration operation through a control operation performed by the travel control unit 30A, thereby returning the distance between the vehicles in the forward travel direction to the appropriate distance. Upon the distance between the vehicles in the forward travel direction returning to the appropriate distance, the cooperative driving control unit 30E restarts automatic driving that is based on a control operation performed by the automatic driving control unit 30C, thereby increasing the vehicle speed to the set speed for normal travel and keeping the distance between the vehicles in the forward travel direction at the appropriate distance.

If the distance between the vehicles in the forward travel direction is longer than the appropriate distance, the cooperative driving control unit 30E outputs an acceleration instruction to the travel control unit 30A. Thus, the cooperative driving control unit 30E causes the main transmission apparatus 32 to perform an acceleration operation through a control operation performed by the travel control unit 30A, thereby returning the distance between the vehicles in the forward travel direction to the appropriate distance. Upon the distance between the vehicles in the forward travel direction returning to the appropriate distance, the cooperative driving control unit 30E restarts automatic driving that is based on a control operation performed by the automatic driving control unit 30C, thereby reducing the vehicle speed to the set speed for normal travel and keeping the distance between the vehicles in the forward travel direction at the appropriate distance.

If the distance between the vehicles in the side-by-side direction is longer than the appropriate distance, the cooperative driving control unit 30E outputs a steering instruction to the travel control unit 30A to travel toward the other vehicle. Thus, the cooperative driving control unit 30E causes the left and right front wheels 9 to steer toward the other vehicle through a control operation performed by the travel control unit 30A, thereby returning the distance between the vehicles in the side-by-side direction to the appropriate distance. Upon the distance between the vehicles in the side-by-side direction returning to the appropriate distance, the cooperative driving control unit 30E restarts automatic driving that is based on a control operation performed by the automatic driving control unit 30C, thereby returning the travel direction of the vehicle body to the travel direction for normal travel and keeping the distance between the vehicles in the side-by-side direction at the appropriate distance.

If the distance between the vehicles in the side-by-side travel direction is shorter than the appropriate distance, the cooperative driving control unit 30E outputs a steering instruction to the travel control unit 30A to travel away from the other vehicle. Thus, the cooperative driving control unit 30E causes the left and right front wheels 9 to steer away from the other vehicle through a control operation performed by the travel control unit 30A, thereby returning the distance between the vehicles in the side-by-side direction to the appropriate distance. Upon the distance between the vehicles in the side-by-side direction returning to the appropriate distance, the cooperative driving control unit 30E restarts automatic driving that is based on a control operation performed by the automatic driving control unit 30C, thereby returning the travel direction of the vehicle body to the travel direction for normal travel and keeping the distance between the vehicles in the side-by-side direction at the appropriate distance.

Thus, it is possible to automatically and appropriately drive the vehicle side-by-side with another preceding vehicle while keeping the distances between the vehicles in the forward travel direction and the side-by-side direction at appropriate distances.

As shown in FIGS. 1 to 3, 6, and 8 to 12, the cabin 4 is provided with, for example: a roof frame 72 that supports the roof 62 and so on; left and right front pillars 73 that support a front end portion of the roof frame 72; left and right center pillars 74 that support an intermediate portion of the roof frame 72 in the front-rear direction; left and right rear pillars 75 that support a rear end portion of the roof frame 72; a front panel 76 that constitutes the front face of the cabin 4; left and right door panels 77 that are supported by the left and right center pillars 74 so as to be able to be swung open and closed; left and right side panels 78 that constitute rear side faces of the cabin 4; and a rear panel 79 that is supported by the roof frame 72 so as to be able to be swung open and closed.

The roof frame 72 includes, for example: a front beam 98 that spans between the left and right front pillars 73; left and right side beams 99 that respectively span between the left and right front pillars 73 and the left and right rear pillars 75; and a rear beam 100 that spans between the left and right rear pillars 75, and has a substantially rectangular shape in plan view.

The left and right front pillars 73 are provided in the vehicle body at positions that are forward of a central portion of the wheelbase L of the vehicle body. Upper halves of the left and right front pillars 73 are curved such that, in a front view, they are located closer to a central portion of the vehicle body in the left-right direction at a higher position, and in a side view, they are located closer to a central portion of the vehicle body in the front-rear direction at a higher position.

The left and right center pillars 74 and the left and right rear pillars 75 are located between the left and right rear fenders 12 on the left and fright sides of the driver's seat 22 and the roof frame 72. The left and right center pillars 74 are curved such that, in a front view, they are located closer to a central portion of the vehicle body in the left-right direction at a higher position, and in a side view, they are located closer to a central portion of the vehicle body in the front-rear direction at a higher position. The left and right rear pillars 75 are curved such that, in a front view, they are located closer to a central portion of the vehicle body in the left-right direction at a higher position, and in a side view, they are in a substantially vertical orientation.

Curved panels that are made of glass, a light-transmitting acrylic resin, or the like and curve along the pillars 73 to 75 and so on corresponding thereto are employed as the panels 76 to 79.

With the above-described configuration, in a lower half portion of the cabin 4, a large space in which the driver sitting on the driver's seat 22 can easily perform various operations using his or her hands or feet, whereas, in an upper half portion of the cabin 4, the width in the front-rear direction and the width in the left-right direction of the roof frame 72 can be narrowed to the extent that riding comfort is not degraded. As a result, it is possible to improve the stability of the vehicle body by reducing the weight and size of an upper portion of the cabin without degrading the operability and riding comfort in the boarding space.

As shown in FIGS. 1 to 3 and 9 to 11, the cabin 4 is provided with an auxiliary frame 90 that extends rearward from upper end portions of the left and right rear pillars 75. The auxiliary frame 90 supports the laser scanner 65 on the rear side, the monitoring camera 66 for capturing an image of objects on the rear side, and so on.

As shown in FIGS. 1 to 3 and 8 to 13, the roof 62 of the cabin 4 provides a storage space 62A that is surrounded by an inner roof 101, an outer roof 102, and a rear cover 123 that are supported by the roof frame 72. An air conditioning unit 120 that performs air conditioning in the cabin is stored in a rear portion of the storage space 62A.

Antennas 121 of the above-described communication module 71 are provided on the upper end portion of the cabin 4, and a communication information processing apparatus 122 of the communication module 71 is provided in the storage space 62A of the roof 62 of the cabin 4.

According to the above-described configuration, the upper end portion of the cabin 4 on which the antennas 121 are located is an upper end portion of the vehicle body, and therefore desirable sensitivity of the antennas 121 can be realized. Also, the roof 62 of the cabin 4 in which the communication information processing apparatus 122 is provided is located at the upper most portion of the vehicle body, which is far away from the engine 6, which exhibits a significant rise in temperature, and the roof 62 allows external air to flow into or around the cabin 4. Therefore, it is possible to simplify the measures that are to be taken to avoid thermal damage to the communication information processing apparatus 122. The communication information processing apparatus 122 is located in the storage space 62A of the roof 62. Therefore, it is possible to protect the communication information processing apparatus 122 from rainwater, dust, and so on, without the need to provide a special waterproof structure or dustproof structure. In addition, the antennas 121 and the communication information processing apparatus 122 are located close to each other, and therefore, the antenna cables (not shown) between them are short and can be easily installed. Also, it is easy to avoid the risk of the antenna cables being damaged during travel by coming into contact with another object.

That is to say, the antennas 121 and the communication information processing apparatus 122 of the communication module 71 can be desirably provided together in an upper portion of the cabin 4. As a result, it is possible to simplify the measures that are to be taken to avoid thermal damage, and prevent the antenna cables from being damaged, for example.

As shown in FIGS. 1 to 3 and 7 to 11, the main ECU 30, the search information processing apparatuses 69, the laser scanners 65, the image processing apparatus 67, and so on are connected to the communication information processing apparatus 122 so as to be able to communicate with each other. The communication module 71 includes, as the antennas 121: a first antenna 121A for in-vehicle information communication through which in-vehicle information acquired by the in-vehicle information acquisition unit 36 is communicated as information regarding cooperative travel with another vehicle; a second antenna 121B for image information communication through which monitored image information from the image processing apparatus 67, included in information monitored by the monitoring unit 54, is communicated; and a third antenna 121C for search information communication through which monitored information from the search information processing apparatuses 69 and the laser scanners 65, included in information monitored by the monitoring unit 54, is communicated.

With the above-described configuration, in-vehicle information such as the vehicle speed acquired by the in-vehicle information acquisition unit 36, monitored information from the search information processing apparatuses 69 and the laser scanners 65, and monitored image information from the image processing apparatus 67 can be desirably communicated via the respective dedicated antennas 121A to 121C.

Also, in-vehicle information acquired by the in-vehicle information acquisition unit 36, monitored information from the search information processing apparatuses 69 and the laser scanners 65, and monitored image information from the image processing apparatus 67 can be shared with another vehicle that is carrying out cooperative travel. By effectively using the shared in-vehicle information, monitored information, and monitored image information, it is easier to perform vehicle speed adjustment in conjunction with another vehicle that is carrying out cooperative travel, avoid contact with an obstacle in conjunction with another vehicle that is carrying out cooperative travel, and so on. As a result, it is possible to more reliably avoid contact with another vehicle that is carrying out cooperative travel, for example.

Specifically, in the above-described cooperative driving mode, if one of the front and rear laser scanners 65 detects that an obstacle has approached and entered the short range of the vehicle body, the contact avoidance control unit 30D starts contact avoidance control, and outputs a deceleration instruction to the cooperative driving control unit 30E in addition to the travel control unit 30A. The cooperative driving control unit 30E transmits this deceleration instruction to the other vehicle via the communication module 71. Thereafter, in a decelerating travel state that is based on the deceleration instruction, the cooperative driving control unit 30E reads the vehicle speed detected by the vehicle speed sensor 38, and transmits the read vehicle speed to the other vehicle via the communication module 71. Also, in a low-speed travel state that is based on the deceleration instruction, if the obstacle detection module 64 detects that an obstacle has approached and entered the immediate range of the vehicle body, the contact avoidance control unit 30D outputs an emergency stop instruction to the cooperative driving control unit 30E in addition to the travel control unit 30A and the work control unit 30B. The cooperative driving control unit 30E transmits this emergency stop instruction to the other vehicle via the communication module 71. In a decelerating travel state initiated by deceleration control, if the laser scanners 65 no longer detect that an obstacle has approached and entered the short range of the vehicle body, the contact avoidance control unit 30D outputs an acceleration instruction to the cooperative driving control unit 30E in addition to the travel control unit 30A. The cooperative driving control unit 30E transmits this acceleration instruction to the other vehicle via the communication module 71. Thereafter, in an accelerating travel state that is based on the acceleration instruction, the cooperative driving control unit 30E reads the vehicle speed detected by the vehicle speed sensor 38, and transmits the read vehicle speed to the other vehicle via the communication module 71.

On the other hand, in the above-described cooperative driving mode, if a deceleration instruction and the vehicle speed of the other vehicle are transmitted from the other vehicle, the communication module 71 receives the deceleration instruction and the vehicle speed, and outputs them to the cooperative driving control unit 30E. The cooperative driving control unit 30E outputs the deceleration instruction and the vehicle speed to the travel control unit 30A, and causes the travel control unit 30A to perform deceleration control through which the vehicle speed is lowered from the set speed for normal travel to the vehicle speed of the other vehicle. In a decelerating travel state initiated by this deceleration control, if an emergency stop instruction is transmitted from the other vehicle, the communication module 71 receives the emergency stop instruction and outputs it to the cooperative driving control unit 30E. The cooperative driving control unit 30E outputs the emergency stop instruction to the travel control unit 30A and the work control unit 30B, and causes the travel control unit 30A and the work control unit 30B to perform emergency stop control through which the vehicle body and the work apparatus are caused to make an emergency stop. In a decelerating travel state initiated by this deceleration control, if an acceleration instruction and the vehicle speed of the other vehicle are transmitted from the other vehicle, the communication module 71 receives the acceleration instruction and the vehicle speed, and outputs them to the cooperative driving control unit 30E. The cooperative driving control unit 30E outputs the acceleration instruction and the vehicle speed to the travel control unit 30A, and causes the travel control unit 30A to perform acceleration control through which the vehicle speed is increased to the set speed for normal travel according to the acceleration of the other vehicle.

As a result, in the above-described cooperative driving mode, for example, upon the cooperative driving control unit 30E of the succeeding vehicle receiving the deceleration instruction and the vehicle speed of the preceding vehicle from the preceding vehicle through wireless communication performed by the communication module 71, the cooperative driving control unit 30E outputs these pieces of received information to the travel control unit 30A of the vehicle (the succeeding vehicle). Thus, it is possible to reduce the vehicle speed of the succeeding vehicle to be the same as the vehicle speed of the decelerated preceding vehicle through deceleration control performed by the travel control unit 30A based on the pieces of output information. In this cooperative low-speed state, upon the cooperative driving control unit 30E of the succeeding vehicle receiving an acceleration instruction and the vehicle speed of the preceding vehicle through wireless communication performed by the communication module 71, the cooperative driving control unit 30E outputs these pieces of received information to the travel control unit 30A of the vehicle. Thus, it is possible to increase the vehicle speed of the succeeding vehicle to be the same as the vehicle speed of the accelerated preceding vehicle through acceleration control performed by the travel control unit 30A based on the pieces of output information. Also, in a cooperative low-speed state, upon the cooperative driving control unit 30E of the succeeding vehicle receiving an emergency stop instruction from the preceding vehicle through wireless communication performed by the communication module 71, the cooperative driving control unit 30E outputs these pieces of received information to the travel control unit 30A of the vehicle. Thus, it is possible to cause the succeeding vehicle to make an emergency stop in conjunction with the preceding vehicle through emergency stop control performed by the travel control unit 30A and the work control unit 30B based on the pieces of output information. As a result, it is possible to prevent the preceding vehicle from colliding with an obstacle, and avoid the risk of the succeeding vehicle colliding with the preceding vehicle due to the preceding vehicle making an emergency stop.

Furthermore, in the above-described cooperative driving mode, if information regarding another vehicle, such as the vehicle speed of the other vehicle and an image of the surroundings of the other vehicle, is transmitted from the other vehicle, the communication module 71 receives this information regarding the other vehicle and outputs it to the cooperative driving control unit 30E, and the cooperative driving control unit 30E outputs the information regarding the other vehicle to a display unit (an example of a display apparatus) 23. If an operation switch (not shown) for displaying information regarding another vehicle on the liquid crystal panel 23A has been operated and a selection has been made to display information regarding another vehicle, the display unit 23 displays information regarding the other vehicle, such as the vehicle speed of the other vehicle and an image of the surroundings of the other vehicle, on the liquid crystal panel 23A.

As a result, for example, if an administrator who manages the operations of the tractors that is travelling in cooperation with each other is on board and drives the preceding vehicle, the administrator can easily monitor and grasp the state of operation of another vehicle that is travelling in cooperation with the preceding tractor and the state of the surroundings of the other vehicle while driving the preceding vehicle, by operating the operation switch for displaying information regarding another vehicle and making a selection to display information regarding the other vehicle.

As shown in FIGS. 1 to 3 and 8 to 11, the first antenna 121A is attached to a right end portion of a rear end portion of the auxiliary frame 90. The second antenna 121B is attached to a left end portion of a rear end portion of the auxiliary frame 90. The third antenna 121C is attached to a supporting portion 73A for a rearview mirror that is provided on an upper end portion of the right front pillar 73. A reception antenna 124 for a radio is attached to the supporting portion 73A for the rearview mirror provide on the upper end of the left front pillar 73. That is to say, the four antennas 121A to 121C and 124 are distributed at four corners of the upper end portion of the cabin 4.

Figure 12:
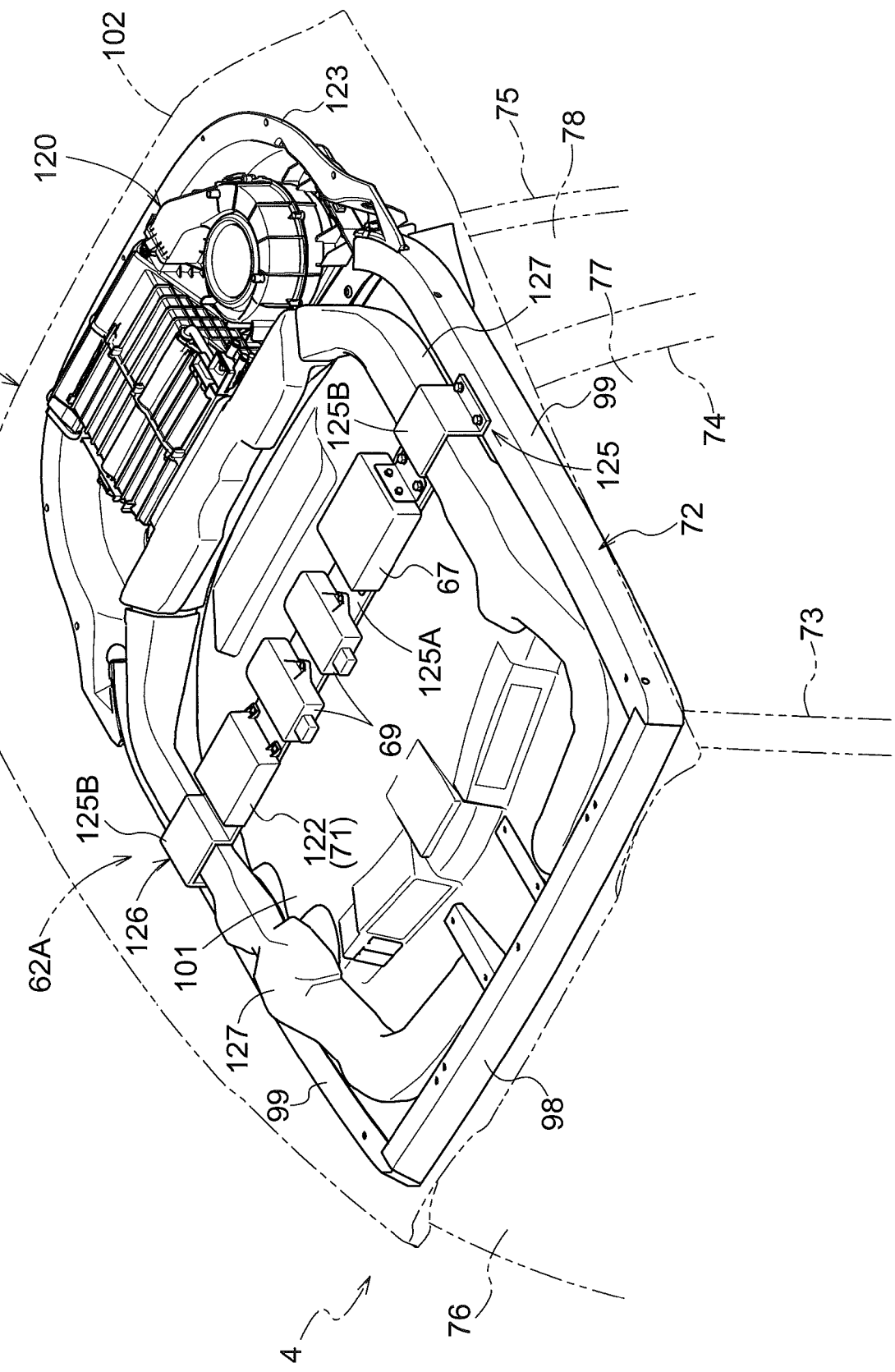
Figure 13:
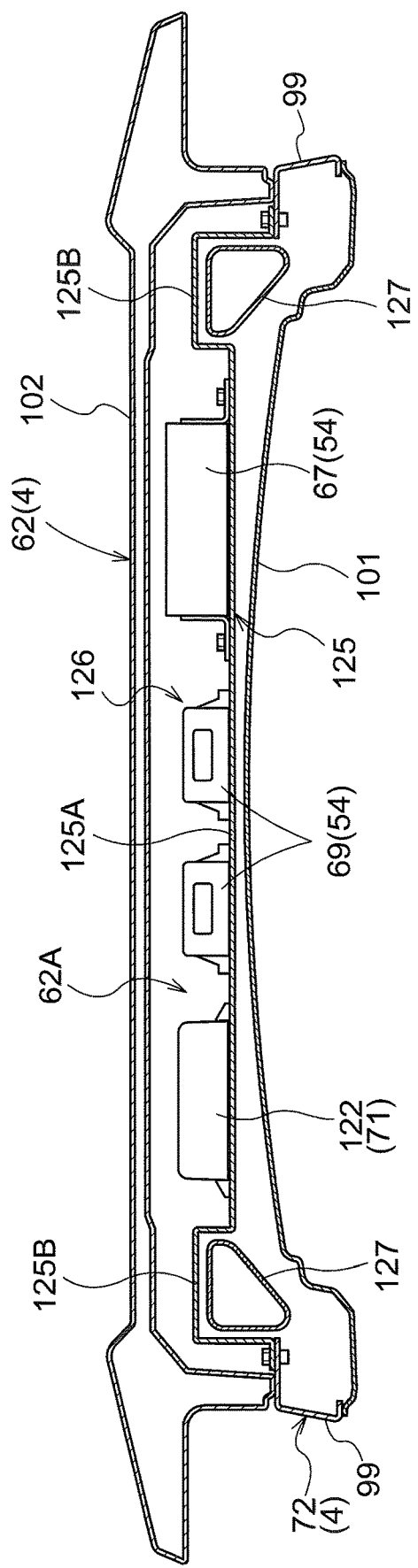

As shown in FIGS. 12 and 13, the image processing apparatus 67 and the two search information processing apparatuses 69 are provided in the storage space 62A of the roof 62. Thus, the storage space 62A of the roof 62 is used to provide the image processing apparatus 67 and the two search information processing apparatuses 69, and therefore there is no need to stress over positioning of the image processing apparatus 67 and the search information processing apparatuses 69 and taking measures to avoid thermal damage. Also, since the image processing apparatus 67 and the two search information processing apparatuses 69 are provided in the storage space 62A of the roof 62 together with the communication information processing apparatus 122, it is possible to efficiently perform attachment and maintenance work on the image processing apparatus 67 and the search information processing apparatuses 69 as well as on the communication information processing apparatus 122.

The cabin 4 is provided with a cross member 125 that is detachably installed so as to span between left and right side beams 99 located at left and right end portions of the roof frame 72. The cross member 125 includes a supporting portion 125A that supports the image processing apparatus 67, the two search information processing apparatuses 69, and the communication information processing apparatus 122 in the storage space 62A of the roof 62.

With the above-described configuration, the image processing apparatus 67, the two search information processing apparatuses 69, and the communication information processing apparatus 122 are attached to the cross member 125 such that they are supported by the supporting portion 125A of the cross member 125, and thus these apparatuses 67, 69, and 122 can be integrated into a processing unit 126. After the cross member 125 of the processing unit 126 has been installed so as to span the left and right side beams 99, an outer roof 102 is attached to the roof frame 72, and thus the image processing apparatus 67, the two search information processing apparatuses 69, and the communication information processing apparatus 122 can be stored in the storage space 62A of the roof 62. Also, in this stored state, by detaching the outer roof 102 from the roof frame 72, the processing unit 126 can be exposed to the outside, and the processing unit 126 can be detached from the roof frame 72.

That is to say, it is possible to improve ease of attaching the image processing apparatus 67, the search information processing apparatuses 69, and the communication information processing apparatus 122 to the storage space 62A of the roof 62, and ease of performing maintenance work on these apparatuses 67, 69, and 122.

As shown in FIGS. 12 and 13, left and right ducts 127 that guide conditioned air to the boarding space are connected to the air conditioning unit 120. The left and right ducts 127 extend from the air conditioning unit 120 to a front end portion of the storage space 62A, along the inner periphery of the roof frame 72. Duct bypassing portions 125B that straddle the left and right ducts 127 along upper portions of the left and right ducts 127 are formed at the left and right ends of the cross member 125 so as to have a bent shape. The supporting portion 125A is formed between the left and right duct bypassing portions 125B of the cross member 125.

Figure 14:
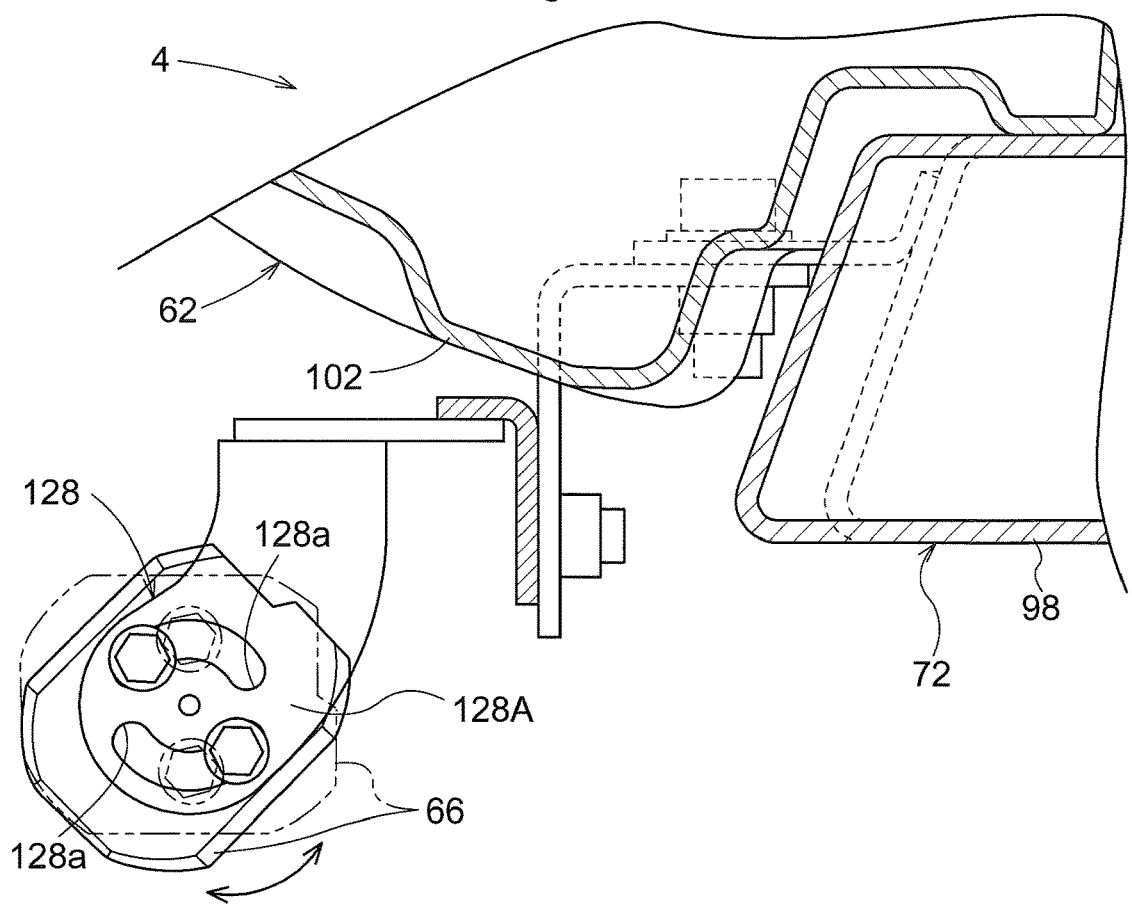
FIG. 14 is a vertical cross-sectional left side view of a main part, showing a supporting structure for a monitoring camera.
Figure 15:
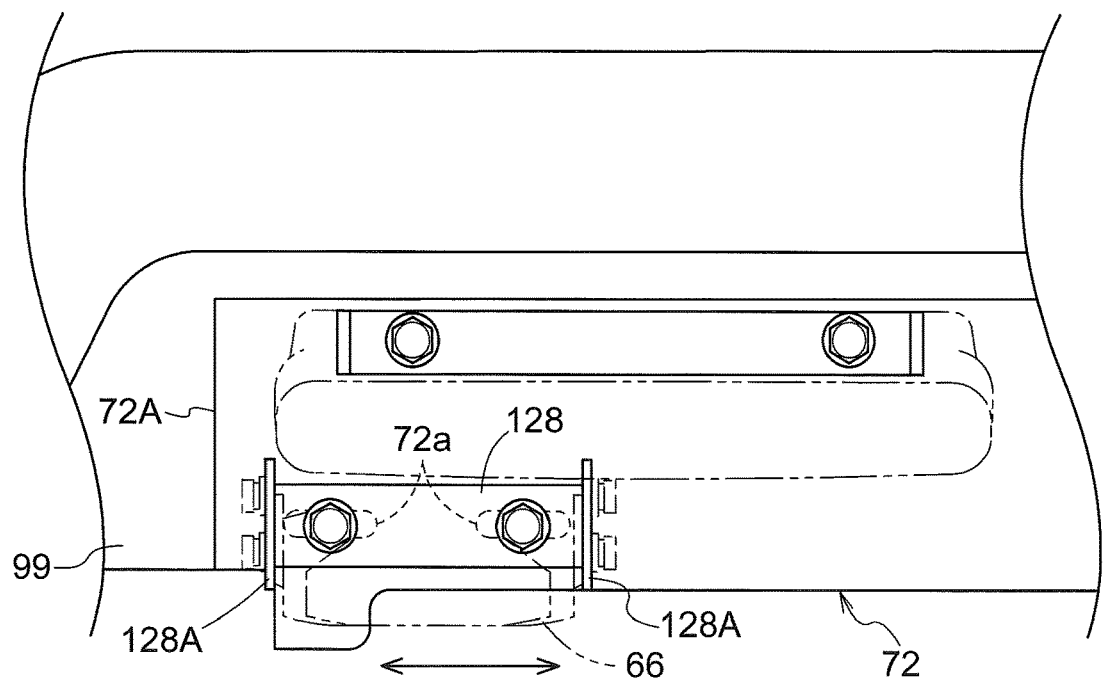
FIG. 15 is a left side view of a main part, showing the supporting structure for the monitoring camera.
Figure 16:
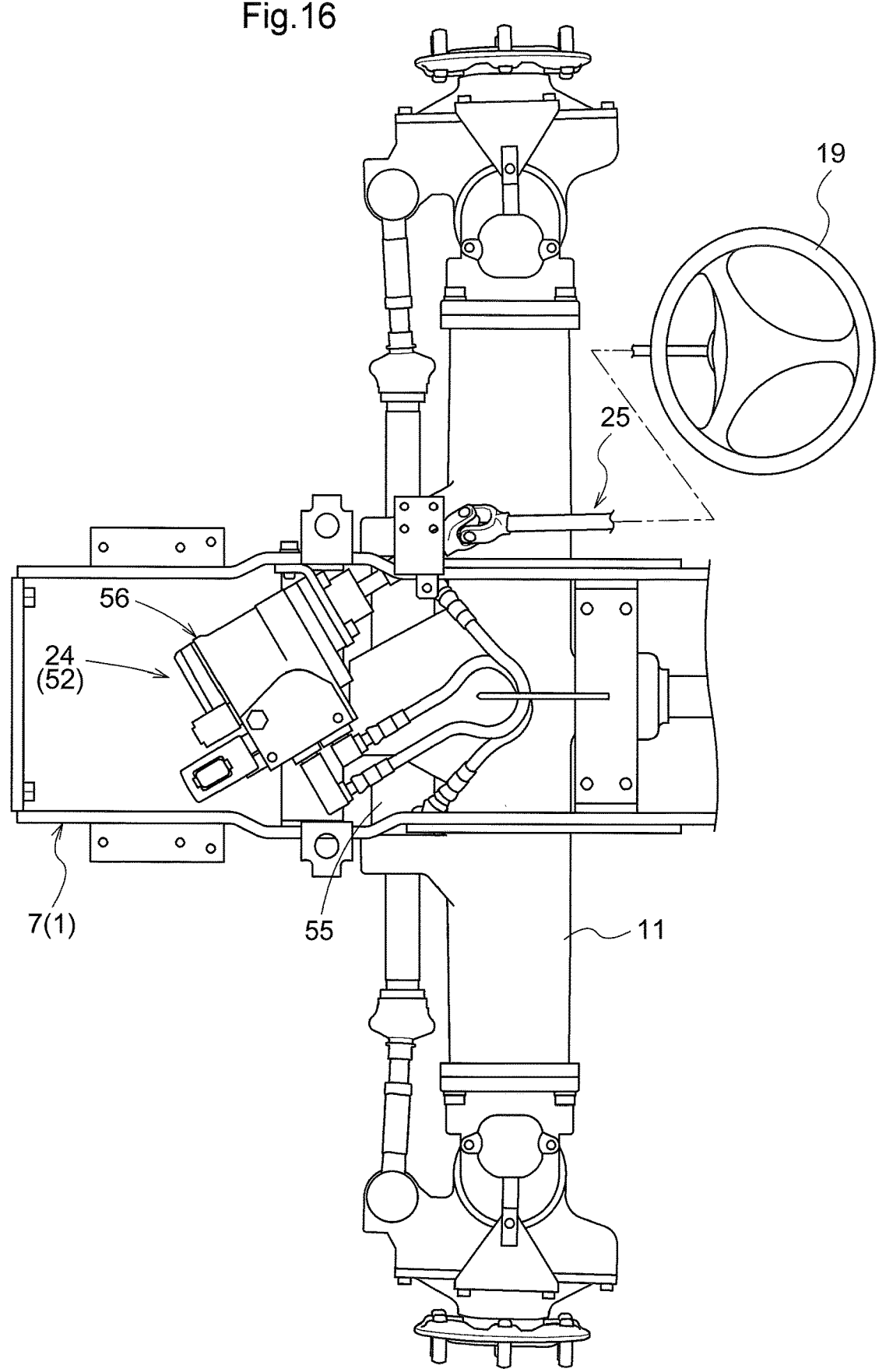
FIG. 16 is a plan view of a main part, showing the configuration and position of a power steering unit.
Figure 17:
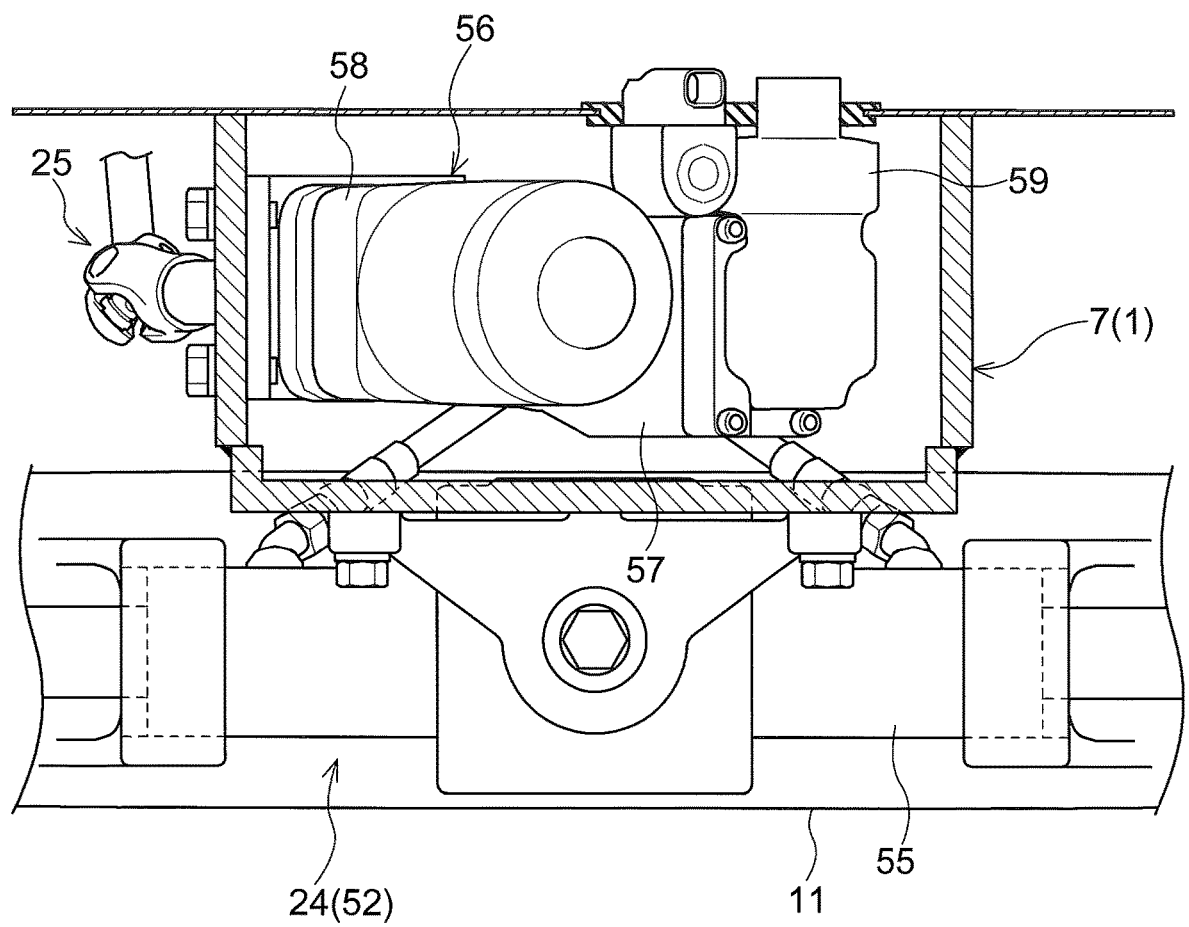
FIG. 17 is a vertical cross-sectional front view of a main part, showing the configuration and position of the power steering unit.
Figure 18:
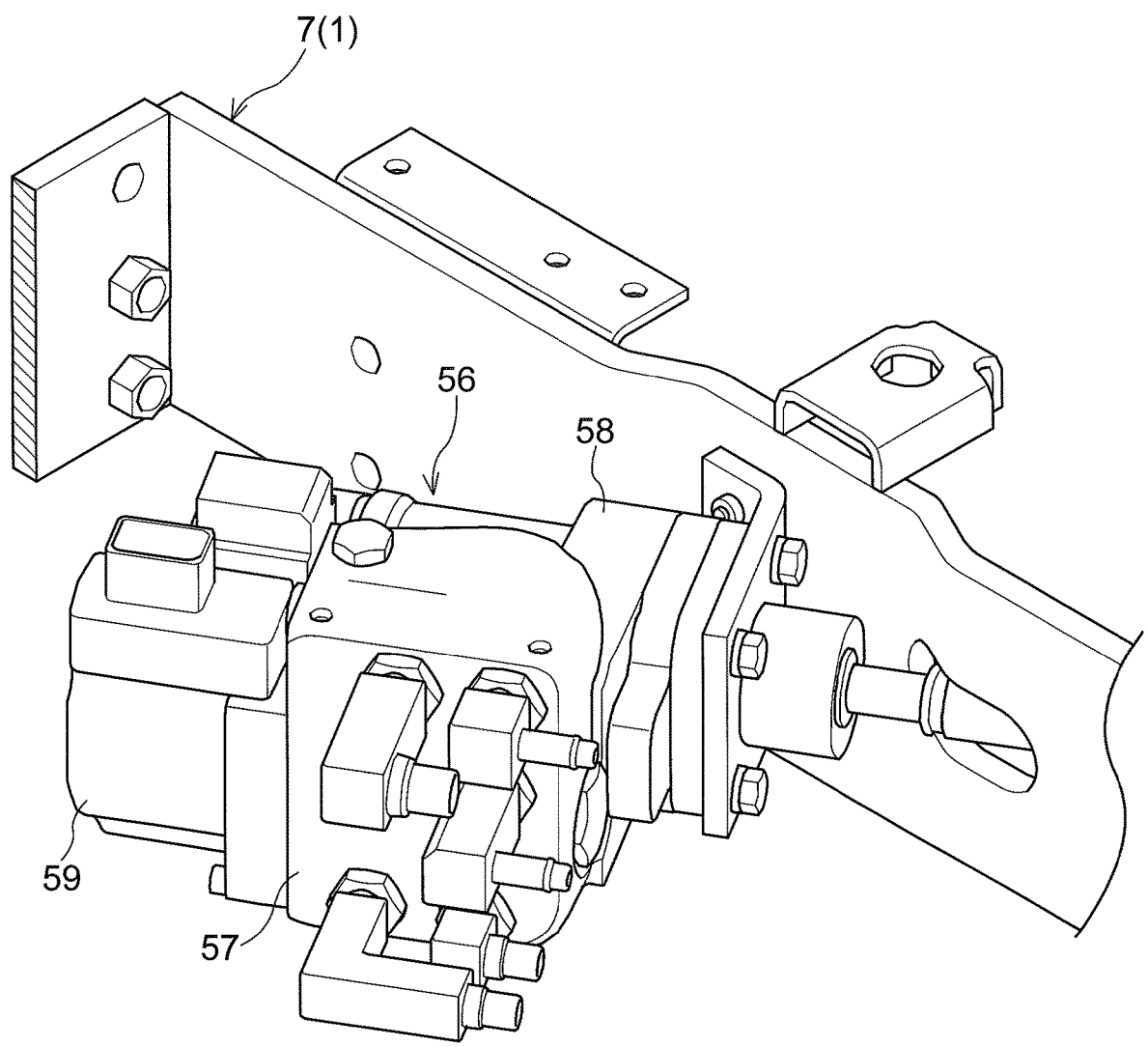
FIG. 18 is a perspective view of a main part, showing, for example, the position of an oil pressure control unit.

As shown in FIGS. 14 and 15, each monitoring camera 66 is installed on an upper portion of the cabin 4 with a U-shaped angle adjuster 128 being interposed therebetween, which changes the installation angle of the monitoring camera 66 in a top-bottom direction. As a result, it is easy to appropriately adjust the installation angles of the monitoring cameras 66, and it is possible to more desirably capture images of the entire surroundings of the vehicle body.

In each angle adjuster 128, a pair of coupling units 128A to which lateral sides of a monitoring camera 66 are attached are each provided with a pair of elongated holes 128a that have a circular arc shape and are used to adjust the angle. Front and rear elongated holes 72a that are formed in a supporting portion 72A of the roof frame 72 and are elongated in the front-rear direction allow the angle adjusters 128 that support the left and right monitoring cameras 66, of the plurality of angle adjusters 128, to be adjusted regarding the position in the front-rear direction of the vehicle body. As a result, it is easy to appropriately adjust the installation positions of the left and right monitoring cameras 66, and it is possible to more desirably capture images of all of the objects located laterally outward of the vehicle body.

As shown in FIGS. 1 to 3 and 8 to 11, the monitoring unit 54 includes eight lights 129 that illuminate areas that are to be captured by the monitoring cameras 66. As a result, it is possible to desirably capture images of the surroundings of the vehicle body using the monitoring cameras 66 even during night work. By sharing the images of the surroundings with another vehicle that is carrying out cooperative travel, and effectively using the images, it is easier to adjust the vehicle speed relative to the vehicle speed of the other vehicle that is carrying out cooperative travel, and avoid contact with an obstacle in conjunction with the other vehicle that is carrying out cooperative travel, even during night work in which visibility is low.

Each monitoring camera 66 has a large number of LEDs. Two of the eight lights 129 are front lights that illuminate objects that are located forward of the vehicle body, and are provided on the roof frame 72 separately on the left and right of the front monitoring camera 66. Two of the eight lights 129 are right lights that illuminate objects that are located to the right of the vehicle body, and are provided on the roof frame 72 at positions above the right monitoring cameras 66. Two of the eight lights 129 are left lights that illuminate objects that are located to the left of the vehicle body, and are provided on the roof frame 72 at positions above the left monitoring cameras 66. Two of the eight lights 129 are rear lights that illuminate objects that are located rearward of the vehicle body, and are provided on the auxiliary frame 90 separately on the left and right of the rear monitoring camera 66.

Figure 6:
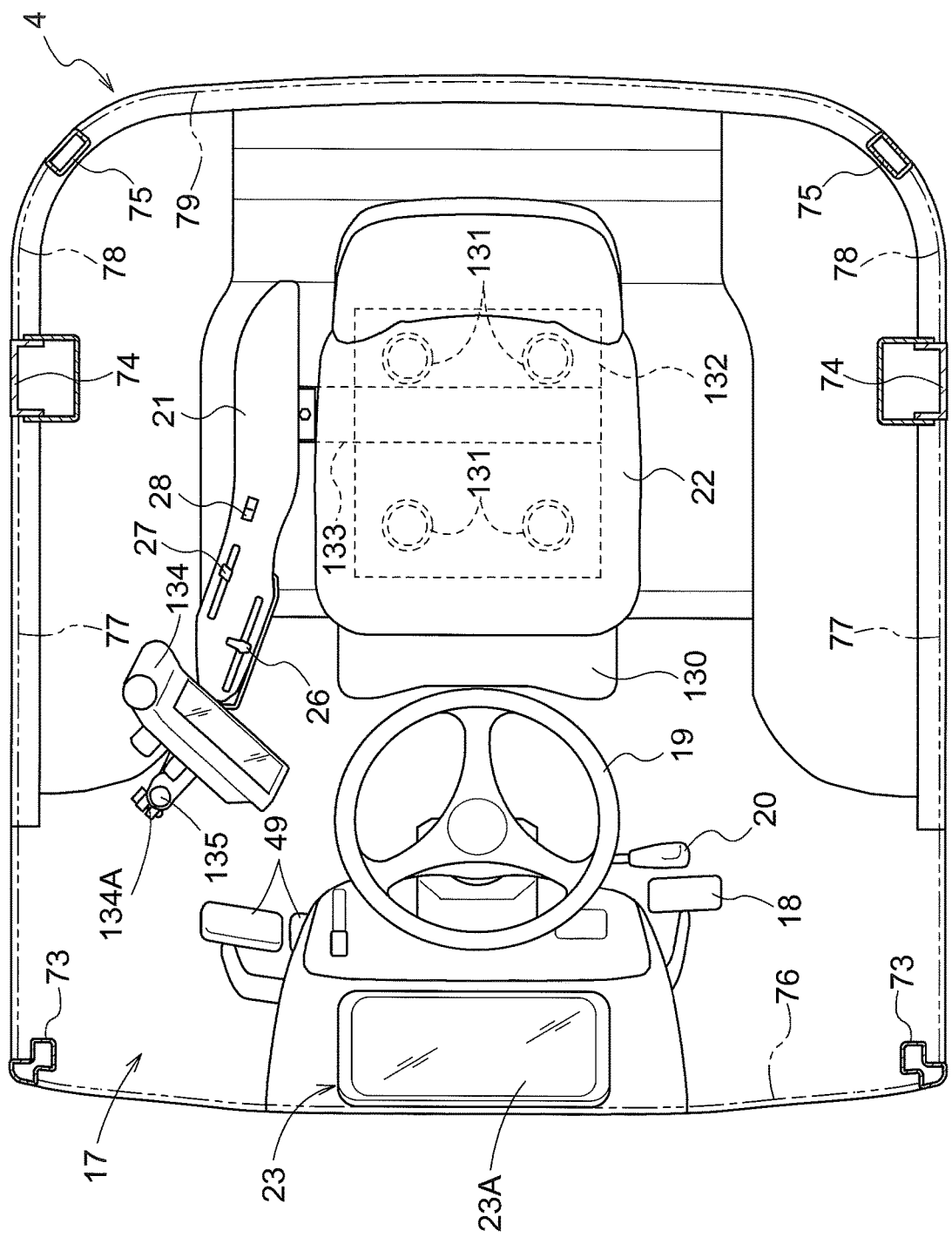
FIG. 6 is a horizontal cross-sectional plan view of a main part showing a configuration of a driver part.
Figure 19:
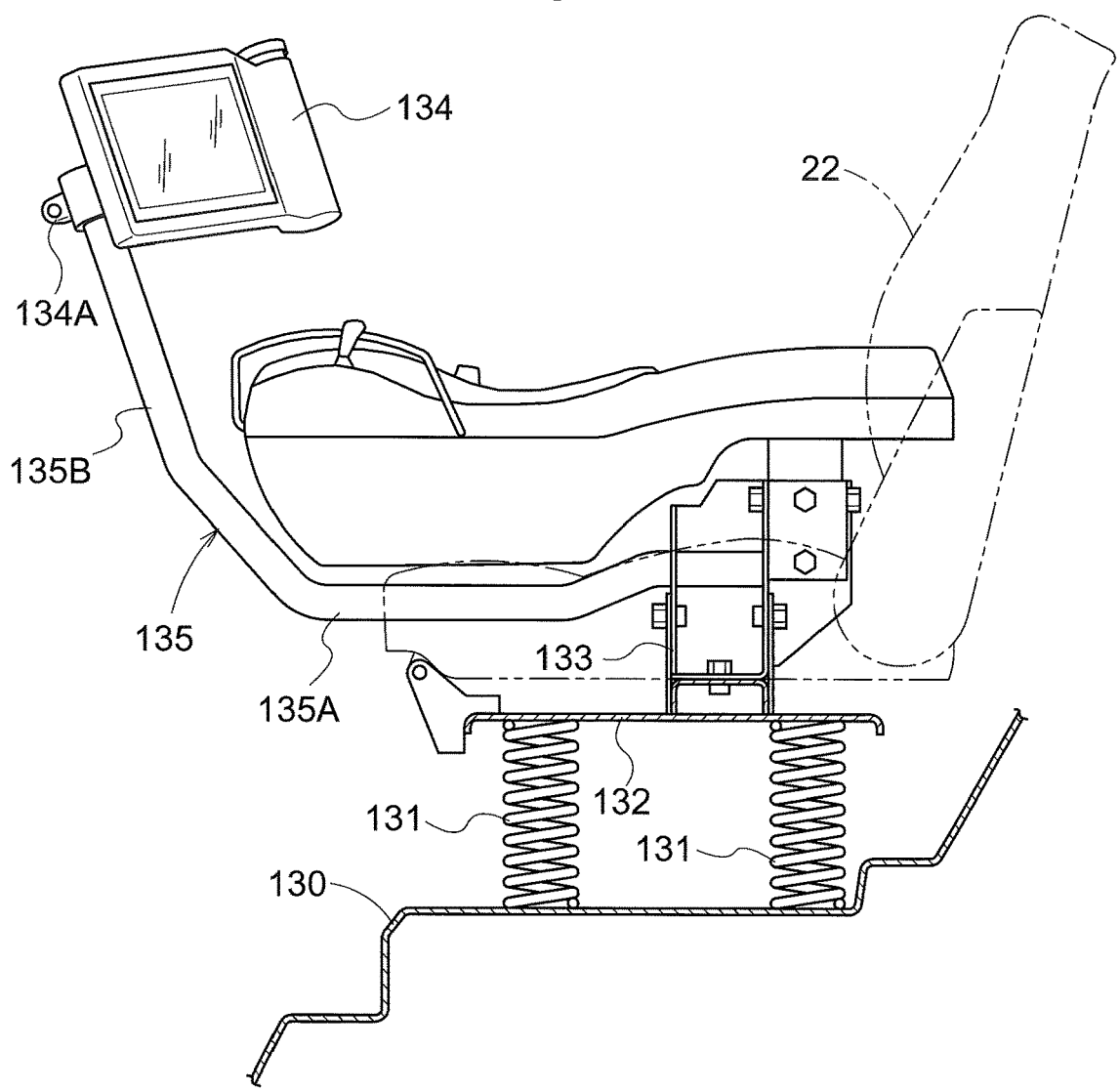
FIG. 19 is a vertical cross-sectional left side view of a main part, showing a supporting structure for a terminal apparatus.
Figure 20:
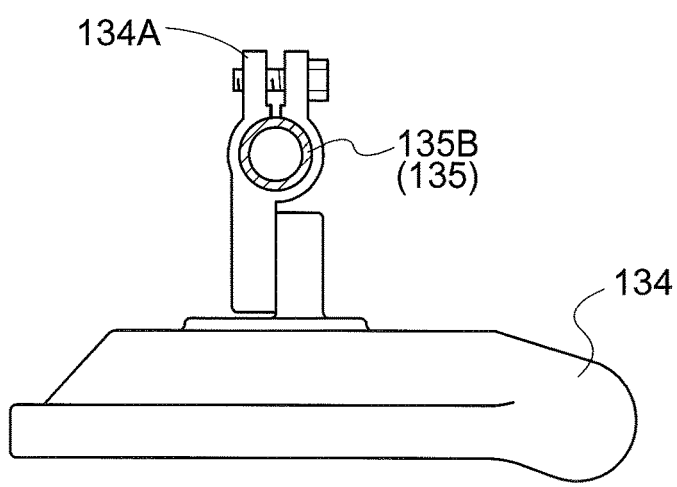
FIG. 20 is a horizontal cross-sectional plan view of a main part, showing a clamp portion of the terminal apparatus.

As shown in FIGS. 1, 6, and 19, the driver's seat 22 is supported on a seat supporting member 130 of the cabin 4 with seat suspensions 131 therebetween. The armrest 21 is supported by a supporting member 133 that extends from a base plate 132 of the driver's seat 22 to a right side portion of the driver's seat 22. A virtual terminal (an example of a terminal apparatus) 134 for inputting information to, and outputting information from, the main ECU 30 is provided in the boarding space of the cabin 4. The virtual terminal 134 is supported by a supporting arm 135 that extends from the supporting member 133.

With the above-described configuration, when vibrations from the road surface are absorbed by the seat suspensions 131, vibration of the virtual terminal 134 is reduced as well as vibration of the driver's seat 22. Therefore, it is possible to significantly suppress shake of the virtual terminal 134 relative to the driver sitting on the driver's seat 22. Thus, it is easier for the driver to operate the virtual terminal 134, and to visually check content displayed on the virtual terminal 134.

That is to say, it is possible to improve the operability of the virtual terminal 134 in the tractor and the visibility of content displayed on the virtual terminal 134. As a result, it is possible to reduce the effort required to operate the tractor.

The supporting arm 135 includes a first arm portion 135A that is made from a round steel pipe and extends from the supporting member 133 toward a position that is forward of the armrest 21, passing under the armrest 21, and a second arm portion 135B that is made from a round steel pipe and extends from the extension end of the first arm portion 135A toward a position that is forward and upward of the armrest 21. The virtual terminal 134 is attached to the extension end of the second arm portion 135B so as to be located above the front end of the armrest 21.

With the above-described configuration, it is possible to provide the virtual terminal 134 at a position above the front end of the armrest 21 without narrowing the area of the seat for the driver. The driver can easily operate the virtual terminal 134 with his/her right arm, with which the driver operates the virtual terminal 134, placed on the armrest 21.

That is to say, it is possible to improve the operability of the virtual terminal 134 in the tractor without degrading riding comfort for the driver on the driver's seat 22.

The virtual terminal 134 has a clamp portion 134A that is switchable to a clamping state in which it clamps the extension end of the second arm portion 135B and a released state in which clamping is released, and is attached to the extension end of the second arm portion 135B such that the position thereof can be changed in the top-bottom direction and the orientation thereof can be adjusted in the direction around the axis of the second arm portion 135B.

As a result, it is possible to easily change the height position of the virtual terminal 134 to an appropriate position according to the driver's physique and preference. Also, it is possible to easily change the orientation of the virtual terminal 134 to an appropriate orientation according to the driver's physique or preference. As a result, it is possible to improve the operability of the virtual terminal 134 in the tractor and the visibility of content displayed on the virtual terminal 134.

Other Embodiments

The present invention is not limited to the configuration illustrated in the embodiment above. The following illustrates other representative embodiments of the present invention.

1. The configurations illustrated below may be employed in the work vehicle.

For example, the work vehicle may have a semi-crawler type configuration that is provided with left and right crawlers instead of the left and right rear wheels 10.

For example, the work vehicle may have a full-crawler type configuration that is provided with left and right crawlers instead of the left and right front wheels 9 and the left and right rear wheels 10.

For example, the work vehicle may be of a two-wheel drive type in which either the left and right front wheels 9 or the left and right rear wheels 10 are driven.

For example, the work vehicle may have an electric type configuration that is provided with an electric motor instead of the engine 6.

For example, the work vehicle may have a hybrid type configuration that is provided with the engine 6 and an electric motor.

2. The roof 62 of the cabin 4 may have a configuration in which the rear cover 123 is not provided and the storage space 62A is formed between the inner roof 101 and the outer roof 102.

3. Only the communication information processing apparatus 122 of the communication module 71 may be stored in the storage space 62A of the roof 62.

Also, in addition to the communication information processing apparatus 122 of the communication module 71, either the image processing apparatus 67 or the search information processing apparatuses 69 may be provided in the storage space 62A of the roof 62.

4. The number and so on of the obstacle searchers 68 and the search information processing apparatuses 69 in the obstacle detection module 64 may be variously changed according to the configuration, size, and so on of the work vehicle.

For example, if the total length of the work vehicle is long, the number of obstacle searchers 68 may be ten or more, and if the total length of the work vehicle is short, the number of obstacle searchers 68 maybe six or less. Also, the number of search information processing apparatuses 69 may be changed according to the number of obstacle searchers 68 or the processing capacity of the search information processing apparatuses 69.

5. Infrared ranging sensors may be employed as the obstacle searchers 68.

6. The armrest 21 and the terminal apparatus 134 may be provide on the left of the driver's seat 22.

INDUSTRIAL APPLICABILITY

The present invention is applicable to a work vehicle such as a tractor, ridable mower, a combine, a ridable rice transplanter, or a wheel loader that is provided with a cabin in which a boarding space is formed, and an electronic control system for automatic driving through which a vehicle body is automatically driven.

The present invention is also applicable to a work vehicle such as a tractor, ridable mower, a combine, a ridable rice transplanter, or a wheel loader in which a driver's seat is supported by a seat supporting member, using seat suspensions.

DESCRIPTION OF REFERENCE SIGNS

4: Cabin
21: Armrest
22: Driver's Seat
23: Display Apparatus
30: Electronic Control Unit
30D: Contact Avoidance Control Unit
36: In-Vehicle Information Acquisition Unit
51: Electronic Control System
53: Positioning Unit
54: Monitoring Unit
62: Roof
62A: Storage Space
66: Monitoring Camera
67: Image Processing Apparatus
68: Obstacle Searcher
69: Search Information Processing Apparatus
70: Cooperation Control Unit
71: Communication Module
72: Roof Frame
101: Inner Roof
102: Outer Roof
121: Antenna
121A: Antenna for In-vehicle Information Communication
121B: Antenna for Image Information Communication (for Monitored Information Communication)
121C: Antenna for Search Information Communication (for Monitored Information Communication)
122: Communication Information Processing Apparatus
125: Cross Member
125A: Supporting Member
128: Angle Adjuster
129: Light
130: Seat Supporting Member
131: Seat Suspension
132: Base Plate
133: Supporting Member
134: Terminal Apparatus
134A: Clamp Portion
135: Supporting Arm
135A: First Arm Portion
135B: Second Arm Portion

The invention claimed is:

1. A work vehicle comprising:
a cabin which is provided beneath an inner roof in a height direction along a height of the work vehicle and in which a boarding space is formed; and
an electronic control system for automatic driving through which a vehicle body is automatically driven,
wherein the electronic control system includes a positioning unit that measures the position and orientation of the vehicle body, and a cooperation control unit that causes the vehicle body to automatically travel in cooperation with another vehicle,
the cabin is provided with a roof that provides a storage space that is provided above the inner roof and below an outer roof in the height direction,
the cooperation control unit includes a communication module that wirelessly communicates with another vehicle to exchange information regarding cooperative travel with the other vehicle, including vehicle body position information, and
a first antenna for in-vehicle information communication, a second antenna for image information communication, a third antenna for search information communication, and a fourth antenna for radio reception are provided on an upper end portion of the cabin, and a communication information processing apparatus of the communication module is provided in the storage space.

2. The work vehicle according to claim 1, further comprising:
an in-vehicle information acquisition unit that acquires in-vehicle information including a vehicle speed; and a monitoring unit that monitors the surroundings of the vehicle body,
wherein the first antenna for in-vehicle information communication is provided through which in-vehicle information acquired by the in-vehicle information acquisition unit is communicated as information regarding cooperative travel with another vehicle, and antennas for monitored information communication are provided through which monitored information monitored by the monitoring unit is communicated as information regarding cooperative travel with another vehicle.

3. The work vehicle according to claim 2,
wherein the monitoring unit includes monitoring cameras that capture images of the surroundings of the vehicle body, and an image processing apparatus that processes the images captured by the monitoring cameras, and
the image processing apparatus is provided in the storage space.

4. The work vehicle according to claim 3,
wherein the monitoring unit includes, as the monitoring cameras, a front monitoring camera that captures an image of objects that are located forward of the vehicle body, a right monitoring camera that captures an image of objects that are located to the right of the vehicle body, a left monitoring camera that captures images of objects that are located to the left of the vehicle body, and a rear monitoring camera that captures an image of objects that are located rearward of the vehicle body,
the front monitoring camera is provided at a front end of the upper end portion of the cabin, at a central position in a left-right direction,
the right monitoring camera is provided at a right end of the upper end portion of the cabin,
the left monitoring camera is provided at a left end of the upper end portion of the cabin, and
the rear monitoring camera is provided at a rear end of the upper end portion of the cabin, at a central position in the left-right direction.

5. The work vehicle according to claim 4,
wherein the monitoring cameras are each provided on the upper end portion of the cabin with an angle adjuster being interposed therebetween, the angle adjuster changing the installation angle of the monitoring camera in a top-bottom direction.

6. The work vehicle according to claim 3,
wherein the monitoring unit includes lights that illuminate areas that are to be captured by the monitoring cameras.

7. The work vehicle according to claim 3,
wherein the monitoring unit includes an obstacle searcher that searches for an obstacle and a search information processing apparatus that performs determination processing to determine whether or not an obstacle has approached based on search information from the obstacle searcher, and
the search information processing apparatus is provided in the storage space.

8. The work vehicle according to claim 7,
wherein the cabin includes a roof frame that has a substantially rectangular shape in plan view and detachably supports the outer roof, and a cross member that is detachably installed so as to span between left and right end portions of the roof frame, and
the cross member includes a supporting member that supports the communication information processing apparatus, the image processing apparatus, and the search information processing apparatus in the storage space.

9. The work vehicle according to claim 7,
wherein the antennas for monitored information communication include the second antenna for image information communication through which information from the image processing apparatus is communicated, and the third antenna for search information communication through which information from the search information processing apparatus is communicated.

10. The work vehicle according to claim 7, further comprising:
a contact avoidance control unit that outputs an emergency stop instruction to the cooperation control unit upon detecting that an obstacle has approached based on the result of determination performed by the search information processing apparatus,
wherein the cooperation control unit communicates with another vehicle to exchange the emergency stop instruction via the communication module as information regarding cooperative travel with the other vehicle, and performs emergency stop control to cause the vehicle body to make an emergency stop based on the emergency stop instruction.

11. The work vehicle according to claim 1, further comprising:
a display apparatus in the boarding space, the display apparatus displaying information regarding another vehicle received by the communication module.

12. A work vehicle comprising:
a cabin in which a boarding space is formed;
an electronic control system for automatic driving through which a vehicle body is automatically driven;
an in-vehicle information acquisition unit that acquires in-vehicle information including a vehicle speed; and
a monitoring unit that monitors the surroundings of the vehicle body,
wherein the electronic control system includes a positioning unit that measures the position and orientation of the vehicle body, and a cooperation control unit that causes the vehicle body to automatically travel in cooperation with another vehicle,
wherein the cabin is provided with a roof that provides a storage space that is surrounded by an inner roof and an outer roof,
wherein the cooperation control unit includes a communication module that wirelessly communicates with another vehicle to exchange information regarding cooperative travel with the other vehicle, including vehicle body position information,
wherein a first antenna for in-vehicle information communication, a second antenna for image information communication, a third antenna for search information communication, and a fourth antenna for radio reception are provided on an upper end portion of the cabin, and a communication information processing apparatus of the communication module is provided in the storage space,
wherein the first antenna for in-vehicle information communication is provided through which in-vehicle information acquired by the in-vehicle information acquisition unit is communicated as information regarding cooperative travel with another vehicle, and antennas for monitored information communication, including the second antenna and the third antenna, are provided through which monitored information monitored by the monitoring unit is communicated as information regarding cooperative travel with another vehicle,
wherein the monitoring unit includes monitoring cameras that capture images of the surroundings of the vehicle body, and an image processing apparatus that processes the images captured by the monitoring cameras,
wherein the image processing apparatus is provided in the storage space,
wherein the monitoring unit includes, as the monitoring cameras, a front monitoring camera that captures an image of objects that are located forward of the vehicle body, a right monitoring camera that captures an image of objects that are located to the right of the vehicle body, a left monitoring camera that captures images of objects that are located to the left of the vehicle body, and a rear monitoring camera that captures an image of objects that are located rearward of the vehicle body, wherein the front monitoring camera is provided at a front end of the upper end portion of the cabin, at a central position in a left-right direction, wherein the right monitoring camera is provided at a right end of the upper end portion of the cabin, wherein the left monitoring camera is provided at a left end of the upper end portion of the cabin, and wherein the rear monitoring camera is provided at a rear end of the upper end portion of the cabin, at a central position in the left-right direction.

* * * * *